United States Patent
Kindred

(10) Patent No.: US 12,373,442 B2
(45) Date of Patent: Jul. 29, 2025

(54) PREDICTIVE MODELING PROFILE CONFIGURATIONS UNDER CONSTRAINED CONDITIONS

(71) Applicant: Express Scripts Strategic Development, Inc., St. Louis, MO (US)

(72) Inventor: Sherry A. Kindred, Crestview, FL (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 18/388,905

(22) Filed: Nov. 13, 2023

(65) Prior Publication Data
US 2024/0160631 A1 May 16, 2024

Related U.S. Application Data

(60) Provisional application No. 63/424,646, filed on Nov. 11, 2022.

(51) Int. Cl.
*G06F 16/2457* (2019.01)
*G06F 16/21* (2019.01)

(52) U.S. Cl.
CPC ........ *G06F 16/2457* (2019.01); *G06F 16/219* (2019.01)

(58) Field of Classification Search
CPC .............................. G06F 16/2457; G06F 16/219
See application file for complete search history.

(56) References Cited

U.S. PATENT DOCUMENTS

| | | |
|---|---|---|
| 6,744,759 B1 | 6/2004 | Sidhu |
| 9,973,448 B2 | 5/2018 | Soelberg |
| 10,028,211 B2 | 7/2018 | Shaw |
| 10,474,954 B2 | 11/2019 | Kumar |
| 10,731,886 B2 | 8/2020 | Li |
| 10,775,186 B2 | 9/2020 | Sharma |
| 11,540,017 B1 | 12/2022 | Moor |
| 2009/0161868 A1 | 6/2009 | Chaudhry |
| 2012/0278476 A1 | 11/2012 | Agrawal |
| 2013/0080577 A1 | 3/2013 | Taylor |
| 2013/0096932 A1 * | 4/2013 | Saidel ............. G06Q 40/08 705/2 |

(Continued)

FOREIGN PATENT DOCUMENTS

WO WO-2014130944 A1 * 8/2014 ......... G06F 19/3418

*Primary Examiner* — Sherief Badawi
*Assistant Examiner* — Earl Levi Elias
(74) *Attorney, Agent, or Firm* — Miller Johnson

(57) ABSTRACT

A computerized method includes obtaining a set of historical data characterizing interactions of a user with a first network provider and a second network provider. The first network provider includes a restrictive condition with respect to the second network provider, and the restrictive condition indicates that a network provider preference included in configuration data corresponding to an account of the user is constrained to one of the first network provider or the second network provider. The method includes generating, using the set of historical data, a predicted network provider indicating one of the first network provider or the second network provider. The method includes communicating the predicted network provider as a recommended network provider preference for the configuration data corresponding to the account of the user.

19 Claims, 16 Drawing Sheets

(56) References Cited

U.S. PATENT DOCUMENTS

| | | | |
|---|---|---|---|
| 2013/0191159 A1* | 7/2013 | Camacho | G06Q 10/10 |
| | | | 705/3 |
| 2014/0180811 A1 | 6/2014 | Boal | |
| 2014/0365017 A1 | 12/2014 | Hanna | |
| 2015/0269348 A1* | 9/2015 | Madjd | G16H 50/30 |
| | | | 705/2 |
| 2016/0112941 A1 | 4/2016 | Desai | |
| 2017/0024794 A1* | 1/2017 | Bianchini | G06Q 30/0631 |
| 2017/0078850 A1 | 3/2017 | Bostick | |
| 2017/0124282 A1* | 5/2017 | Hayden | G16H 50/20 |
| 2020/0342969 A1* | 10/2020 | White | G06Q 30/0206 |
| 2021/0265063 A1* | 8/2021 | Karampourniotis | G16H 50/70 |
| 2021/0274043 A1 | 9/2021 | Jung | |

* cited by examiner

PREDICTIVE MODELING PROFILE CONFIGURATIONS UNDER CONSTRAINED CONDITIONS

CROSS-REFERENCE TO RELATED APPLICATIONS

This application claims the benefit of U.S. Provisional Application No. 63/424,646 filed Nov. 11, 2022, the entire disclosure of which is incorporated by reference.

FIELD

The present disclosure relates to predictive modeling for data configurations.

BACKGROUND

Often in healthcare, healthcare patients become members of healthcare provider networks (e.g., healthcare insurance networks). These provider networks may be beneficial to their members because their members can enjoy benefits such as cost advantageous drug prices. For example, a group of members under a provider network affords the network with greater collective bargaining power to have stable contractual healthcare costs for its members. As part of the provider network, the members may have access to the network's offering of healthcare providers (e.g., doctors, specialists, pharmacies, etc.) that are considered "in-network." Generally, contractual relationships between these "in-network" providers and the network allow network member's to have a relatively predictable cost structure for the goods and/or services of the in-network providers.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computerized method comprising obtaining a set of historical data characterizing interactions of a user with a first network provider and a second network provider. The first network provider includes a restrictive condition with respect to the second network provider. The restrictive condition indicates that a network provider preference included in configuration data corresponding to an account of the user is constrained to one of the first network provider or the second network provider. The method includes generating, using the set of historical data, a predicted network provider indicating one of the first network provider or the second network provider. The method includes communicating the predicted network provider as a recommended network provider preference for the configuration data corresponding to the account of the user.

In other features, the recommended network provider preference is manually overridable by the user at a graphical user interface (GUI). In other features, obtaining the set of historical data characterizing interactions of the user with the first network provider and the second network provider includes querying a set of databases including the set of historical data using query terms that include the user, the first network provider, and the second network provider.

In other features, the computerized method includes, in response to the query, receiving an empty data set as the set of historical data. In other feature, generating the predicted network provider includes generating, the predicted network provider to match a predicted network provider for another a second user associated with a group of users that include the user. In other feature, the second user has a non-empty data set of historical data.

In other features, obtaining the set of historical data characterizing interactions of the user with the first network provider and the second network provider is in response to an enrollment request to enroll a user group with a plurality of network providers. In other features, the user group includes a plurality of sets of users. In other features, a respective set of users includes more than one user sharing a relationship attribute and the more than one user includes the user.

In other features, the computerized method includes receiving an enrollment request for a group of users including the user. In other features the enrollment request requests enrollment with a set of network providers. In other features the set of network providers includes the first network provider and the second network provider. In other features, determining that the first network provider of the set of network providers includes the restrictive condition with respect to the second network provider of the set of network providers.

In other features, the computerized method includes receiving an enrollment request to switch a user group from a single network provider to a plurality of network providers. In other features, the user group includes a plurality of sets of users. In other features, at least one set includes more than one user sharing a relationship attribute. In other features, the at least one set includes the user. In other features, the set of network providers includes the first network provider and the second network provider.

In other features, the computerized method includes receiving a request to change a user group that includes the user from a first configuration data policy to a second configuration data policy. In other features, the first configuration data policy has a first data state where each user of the user group includes an identical network provider preference as configuration data. In other features, the second configuration data policy has a second data state where the user group includes network providers preferences corresponding to more than one network provider as configuration data.

In other features, the user group is associated with a group data management level. In other features, the first configuration data policy is applied at the group data management level such that all users of the user group have the identical network provider preference as configuration data. In other features, a set of users is a subset of the user group and is associated with a user data management level. In other features, the second configuration data policy is applied at the user data management level such that each user of the set of users has a personalized network provider assigned from the more than one network provider. In other features, a trained machine learning model generates the predicted network provider.

A computer system includes memory hardware storing instructions and processing hardware configured to execute the instructions. The instructions include obtaining a set of historical data characterizing interactions of a user with a first network provider and a second network provider. In other features, the first network provider includes a restrictive condition with respect to the second network provider.

In other features, the restrictive condition indicates that a network provider preference included in configuration data corresponding to an account of the user is constrained to one of the first network provider or the second network provider. The instructions include generating, using the set of historical data, a predicted network provider indicating one of the first network provider or the second network provider. The instructions include communicating the predicted network provider as a recommended network provider preference for the configuration data corresponding to the account of the user.

In other features, obtaining the set of historical data characterizing interactions of the user with the first network provider and the second network provider is in response to an enrollment request to enroll a user group with a plurality of network providers. In other features, the user group includes a plurality of sets of users. In other features, a respective set of users includes more than one user sharing a relationship attribute.

In other features, the instructions stored in the memory hardware include receiving an enrollment request for a group of users including the user, wherein the enrollment request requests enrollment with a set of network providers, and wherein the set of network providers includes the first network provider and the second network provider. The instructions include determining that the first network provider of the set of network providers includes the restrictive condition with respect to the second network provider of the set of network providers.

In other features, the instructions stored in the memory hardware include receiving a request to change a user group that includes the user from a first configuration data policy to a second configuration data policy. In other features the first configuration data policy has a first data state where each user of the user group includes an identical network provider preference as configuration data. In other features, the second configuration data policy has a second data state where the user group includes network providers preferences corresponding to more than one network provider as configuration data. In other features, the user group is associated with a group data management level. In other features, the first configuration data policy is applied at the group data management level such that all users of the user group have the identical network provider preference as configuration data. In other features, a set of users is a subset of the user group and is associated with a user data management level. In other features, the second configuration data policy is applied at the user data management level such that each user of the set of users has a personalized network provider assigned from the more than one network provider.

A non-transitory computer-readable medium stores processor-executable instructions. The instructions include obtaining a set of historical data characterizing interactions of a user with a first network provider and a second network provider. In other features, the first network provider includes a restrictive condition with respect to the second network provider. In other features, the restrictive condition indicates that a network provider preference included in configuration data corresponding to an account of the user is constrained to one of the first network provider or the second network provider. The instructions include generating, using the set of historical data, a predicted network provider indicating one of the first network provider or the second network provider. The instructions include communicating the predicted network provider as a recommended network provider preference for the configuration data corresponding to the account of the user.

In other features, obtaining the set of historical data characterizing interactions of the user with the first network provider and the second network provider is in response to an enrollment request to enroll a user group with a plurality of network providers. In other features, the user group includes a plurality of sets of users. In other features, a respective set of users includes more than one user sharing a relationship attribute.

In other features, the instructions stored in the non-transitory computer readable medium include receiving an enrollment request for a group of users including the user, wherein the enrollment request requests enrollment with a set of network providers, and wherein the set of network providers includes the first network provider and the second network provider. The instructions include determining that the first network provider of the set of network providers includes the restrictive condition with respect to the second network provider of the set of network providers.

In other features, the instructions stored in the non-transitory computer readable medium include receiving a request to change a user group that includes the user from a first configuration data policy to a second configuration data policy. In other features the first configuration data policy has a first data state where each user of the user group includes an identical network provider preference as configuration data. In other features, the second configuration data policy has a second data state where the user group includes network providers preferences corresponding to more than one network provider as configuration data. In other features, the user group is associated with a group data management level. In other features, the first configuration data policy is applied at the group data management level such that all users of the user group have the identical network provider preference as configuration data. In other features, a set of users is a subset of the user group and is associated with a user data management level. In other features, the second configuration data policy is applied at the user data management level such that each user of the set of users has a personalized network provider assigned from the more than one network provider.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
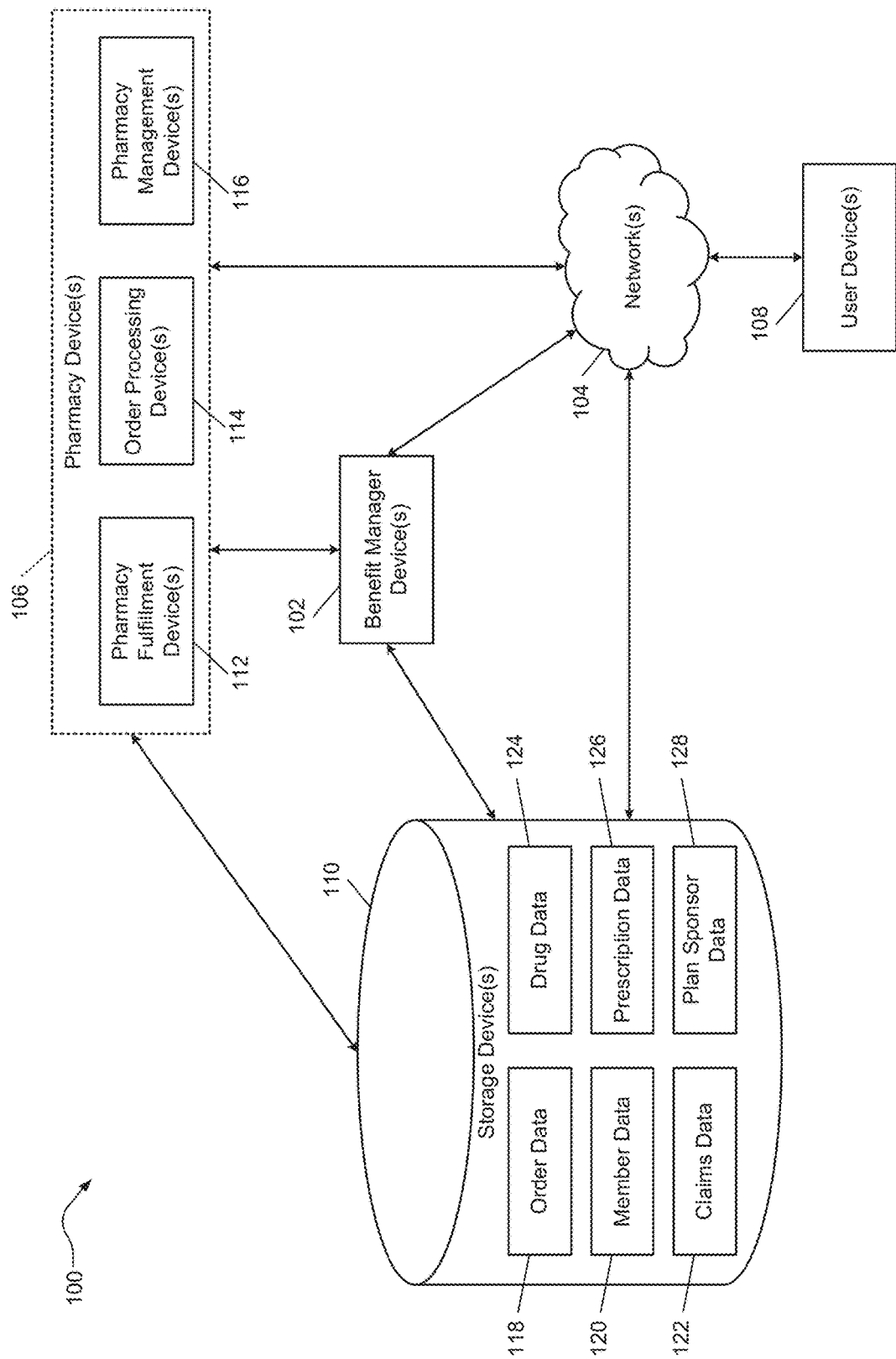
FIG. 1 is a functional block diagram of an example system including a high-volume pharmacy.

Many healthcare consumers are members of a multi-tiered system that has been managed traditionally from the top level down. For example, an employee often receives her healthcare benefits from her employer. In this structure, the member or employee is considered part of a household. This household may be a single member household (e.g., a non-married member without dependents) or a multi-member household (e.g., a primary member, such as the employee, and the primary member's family of dependents, who are also members). To continue with the example, the employer can therefore have several households as part of the employer's group. Therefore, in this traditional multi-tiered system, the group is the first tier and can consist of a set of members called households that are the second tier, which are made up of individual members as the third tier.

When a multi-member entity, such as an employer, provides benefits (e.g., in-network providers) to its members (e.g., its employees), those benefits are typically managed at the group level (or first tier). For instance, the employer may provide (e.g., via its insurance policy) Pharmacy 1 as the in-network pharmacy for the group. Here, Pharmacy 1 gets applied or enrolled at the group level such that all the individual members receive Pharmacy 1 as their in-network pharmacy.

Unfortunately, the individual members in this model may be unable to use a preferred provider. For example, the individual member may find another pharmacy, such as Pharmacy 2, more convenient, but be restricted from using that more convenient pharmacy as their in-network pharmacy because the group has set the in-network pharmacy provider for all of its individual members at the group level as Pharmacy 1.

To compound the situation, network providers, such as pharmacy providers, often discount prescription pricing if the member group exclusively uses that network provider. As a result, it may be cost effective for the member group as a whole to use an exclusive single network provider (e.g., that operates Pharmacy 1).

Due to these restrictive conditions or constraints, in order for a member group to offer multiple network providers for the convenience of their members, the member group will likely have to pay more for this optionality and potentially not receive low cost product/service offerings by certain network providers. For instance, if there are two dominant pharmacy network providers who are rivals, a member group that wishes for their members to have in-network access to both pharmacy networks may have to pay a premium for such a policy. It is common for a provider network, like a dominant pharmacy network with a rival, to have restrictive conditions or exclusionary conditions that, when met, allow the enrolled members to receive greatly reduced in-network costs for goods such as drug prescriptions.

Because of the top-down management of provider networks, combined with common restrictive conditions imposed by the provider networks, an individual member's data configuration policy has traditionally been dependent on the data configuration of the member group. For example, when the member group enrolls with WALGREENS® for their network pharmacy provider, the configuration data for all individual members of the member group is identically set to WALGREENS® as the in-network pharmacy. In this respect, if an individual member lives next to a CVS®, that individual member's in-network pharmacy of WALGREENS® is not mutable at the individual member level (e.g., outside of an enrollment period); in other words, the individual member has no capability to change their network provider at the individual member level based on individual member preference (e.g., like walking next door for prescriptions).

The present disclosure describes managing network provider preferences at the individual member level by novel data processing. In some examples, to implement this approach, a system uses a predictive model to predict individual member preferences. The system may then pass these predicted preferences to a member account system that implements the provider preferences with or without input by the individual member. For instance, the system implements the provider preferences by updating or maintaining a data configuration corresponding to a preferences profile associated with the individual member. In this approach, the system can account for restrictive conditions, for example, by predicting only a single network provider preference. In that respect, if a network provider has restrictive conditions that would constrain the number of network providers offered to an individual member, the predictive model can be informed of these restrictions and predict a preference that satisfies those restrictions (e.g., a single provider preference). By using this approach, each individual member would be prohibited from violating such restrictions; enabling each individual member to have the opportunity to receive advantageous product/services price reductions and network connections while also meeting their personal preferences. To continue upon the previous example, that means that the individual member living next to CVS® could choose CVS® as his or her in-network pharmacy provider while his or her colleague uses WALGREENS® even though they are members of the same member group.

High-Volume Pharmacy

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104. The system 100 can be a provider offered with a network as described herein.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long-term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However, in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication. The pharmacy device 106 can be an in-network device as described herein.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, age, date of birth, address (including city, state, and zip code), telephone number, e-mail address, medical history, prescription drug history, etc. In various implementations, the prescription drug history may include a prior authorization claim history—including the total number of prior authorization claims, approved prior authorization claims, and denied prior authorization claims. In various implementations, the prescription drug history may include previously filled claims for the member, including a date of each filled claim, a dosage of each filled claim, the drug type for each filled claim, a prescriber associated with each filled claim, and whether the drug associated with each claim is on a formulary (e.g., a list of covered medication).

In various implementations, the medical history may include whether and/or how well each member adhered to one or more specific therapies. The member data 120 may also include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. In various implementations, the member data 120 may include an eligibility period for each member. For example, the eligibility period may include how long each member is eligible for coverage under the sponsored plan. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member). In various implementations, the claims data 122 may include a percentage of prior authorization cases for each prescriber that have been denied, and a percentage of prior authorization cases for each prescriber that have been approved.

The drug data 124 may include drug name (e.g., technical name and/or common name), other names by which the drug is known, active ingredients, an image of the drug (such as in pill form), etc. The drug data 124 may include information associated with a single medication or multiple medications. For example, the drug data 124 may include a numerical identifier for each drug, such as the U.S. Food and Drug Administration's (FDA) National Drug Code (NDC) for each drug.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
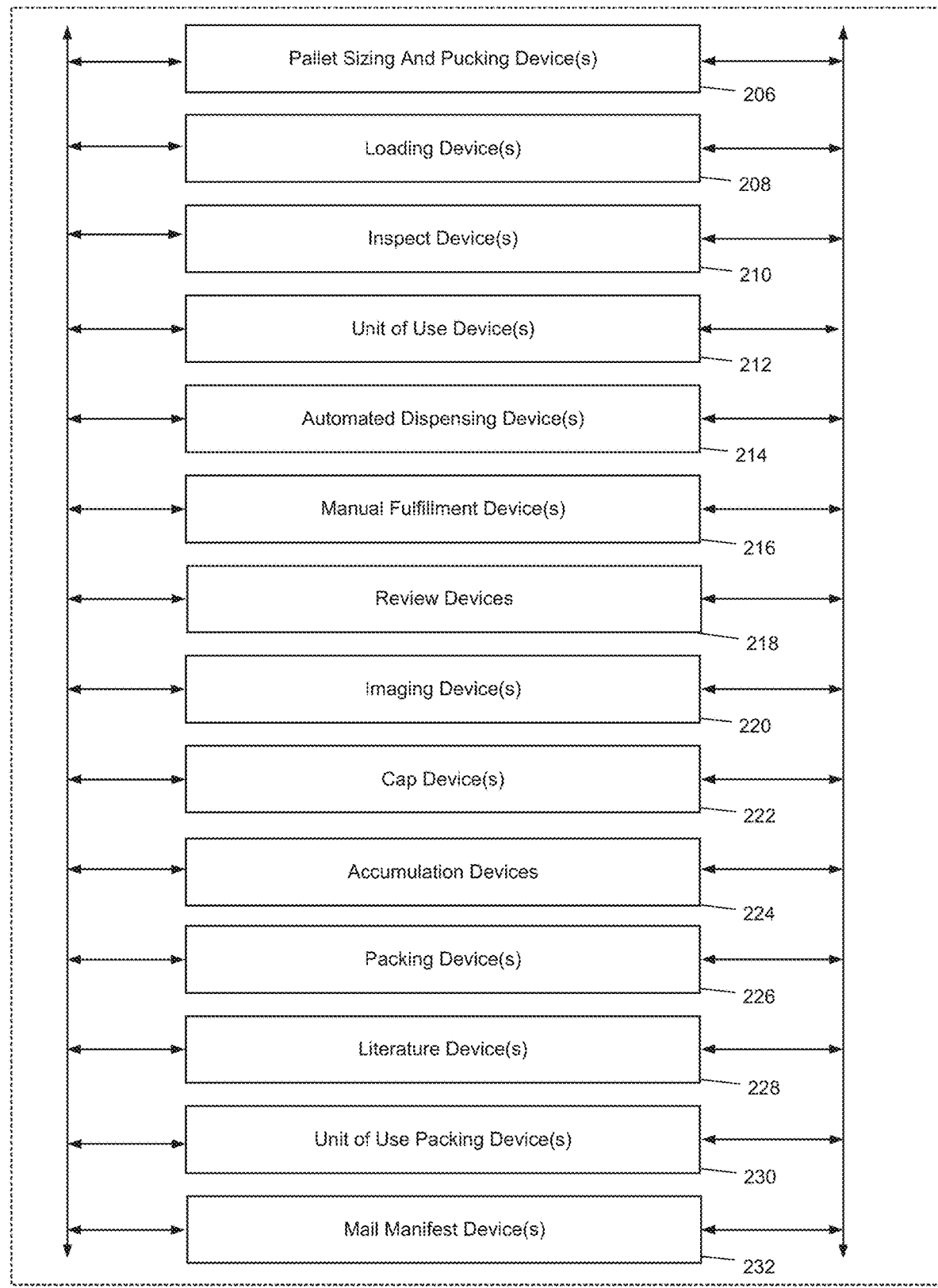
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
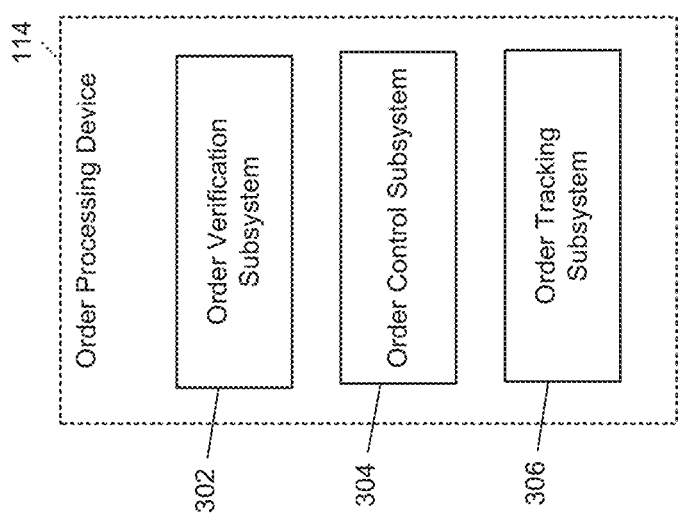
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Predicting Profile Configurations Under Constrained Conditions

Figure 4:
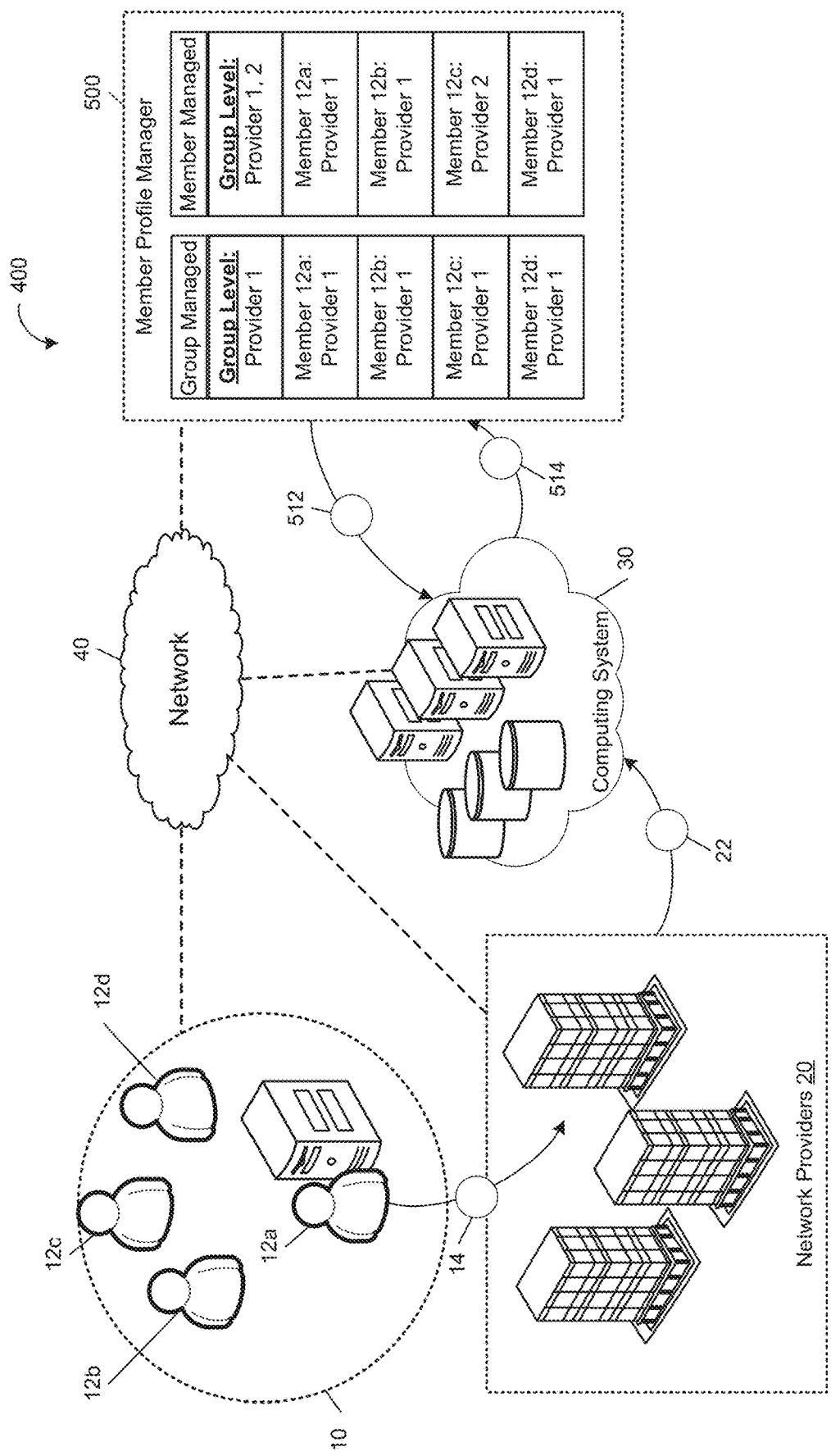
FIG. 4 is a schematic view of an example prediction environment for a member profile manager.

Referring to FIG. 4, the prediction environment 400 includes a member group 10 that corresponds to a set of individual members 12a-12d. Here, a member 12 may refer to a data record of a user or participant of a network that receives benefits from one or more providers associated with that network. Often to receive such benefits, the user enrolls or joins the network. In some examples, a user may join a network (i.e., become a member 12) as part of a member group 10. For instance, the user, as an employee, may join a network associated with his or her employer such that the user and his or her coworkers are a member group 10. In some implementations, the associated member group is saved as part of the member 12 data record. In some implementations, a member 12 includes a data flag (or indicator, such as a Boolean variable) indicating whether the member 12 is associated with a member group. A member 12 may include an electronic device running instructions to enable communication other devices and systems and/or the data record corresponding to the user or participant of the benefit network.

While being a member, each individual member 12 may have interactions 14 with network providers 20, such as pharmacies and pharmacy related devices. These interactions 14 may be characterized and stored as historical data 22. For example, an entity that administers a network policy may receive or obtain historical data 22 that characterizes interactions 14 between a member 12 (also referred to as a user) and a particular network provider. For instance, a network administer may store the historical data 22 as claim records, e.g., files in a database, for the member 12 that include information regarding a member's interaction 14 with a network provider 20.

As an example, the historical data 22 is a claim record that includes information regarding a member 12 purchasing prescription drugs from an in-network pharmacy provider. In some implementations, the information captured as historical data 22 includes information about the member 12 (e.g., a unique member identifier), the purchased good(s) or service(s) (e.g., the purchased prescription drug, a quantity of volume of the purchased drug, and/or a difference between the quantity purchased and the quantity prescribed), an indication of whether the purchase was subject to any price reduction, the network provider involved in the interaction 14 with the member 12, information regarding the member group 10 that the member 12 belongs to, information about whether the interaction was in-network or out-of-network, and other transactional information about the interaction 14 such as date and/or time of the interaction 14. The claims record can also include prescription fulfillment data relating to out-of-network pharmacy providers.

In some configurations, a network administrator stores the historical data 22 in a computing system 30 that is remote from the member 12 (e.g., a distributed computing system or cloud computing system). The remote computing system 30 may be capable of storing the historical data 22 in one or more memory resources such as databases datastores, and/or blockchains. In some implementations, the information included in the historical data 22 is ingested by a data storage system associated with the computing system 30 (e.g., using data processing hardware resources associated with the computing system 30). Upon ingestion, the historical data 22 may populate or form one or more record entries in a set of databases. In various implementations, the computing system 30 stores the historical data 22 as a single record entry in a database. As shown in FIG. 4, the historical data flow may be such that a member's interaction 14 with a network provider 20 is communicated from the network provider 20 to the computing system 30 for storage via a network 40 (e.g., by the internet or some type of wide area network).

As a member 12 of a network, the member 12 may have an account profile that has configuration data. This configuration data may characterize attributes about the member 12 and/or member information such as the network with which he or she belongs and/or the network providers that are or are not available to the member 12 (i.e., in-network network providers and out-of-network network providers). For instance, the configuration data may include information about the member 12 such as the member's address, whether the member is part of a household (i.e., has one or more associated dependent members), what member group 10 that the member 12 is associated with, benefit information, etc.

To manage the account profiles of members 12, the environment 400 includes a member profile manager 500. The member profile manager 500 is configured to generate, update, and/or maintain configuration data that generates the account profile for each member 12. Additionally, the member profile manager 500 is configured to provide predicted profile configurations that aim to predict individual member preferences. In other words, the member profile manager 500 supports an insurance network where the member 12 has the choice of their own benefit preferences at the member level instead of being tied to the preferences for the member's associated member group 10 (i.e., managed at the group level).

For instance, as shown in FIG. 4, when the member preferences are managed at the group level, the configuration data policy has a data state where each member 12 of the member group 10 has an identical network provider preference (e.g., shown as all members having Provider 1) as configuration data because that provider preference has been selected at the group level and applied to all members 12 of the group 10. On the other hand, as also shown in FIG. 4, when the member preferences are managed at the individual level, the configuration data policy has a data state where the individual member can select their own benefits and different members of a set of members can include different network provider preferences at the same time. For example, members 12a, 12b, and 12d have chosen to have Provider 1 while member 12c has chosen to have Provider 2. That is, an individual member may select a first network provider for themselves while their wife who is another member selects a second network provider that is different that the first network provider. In this respect, members 12 of the group 10 and even members 12 of the household can have varying network providers.

Figure 5A:
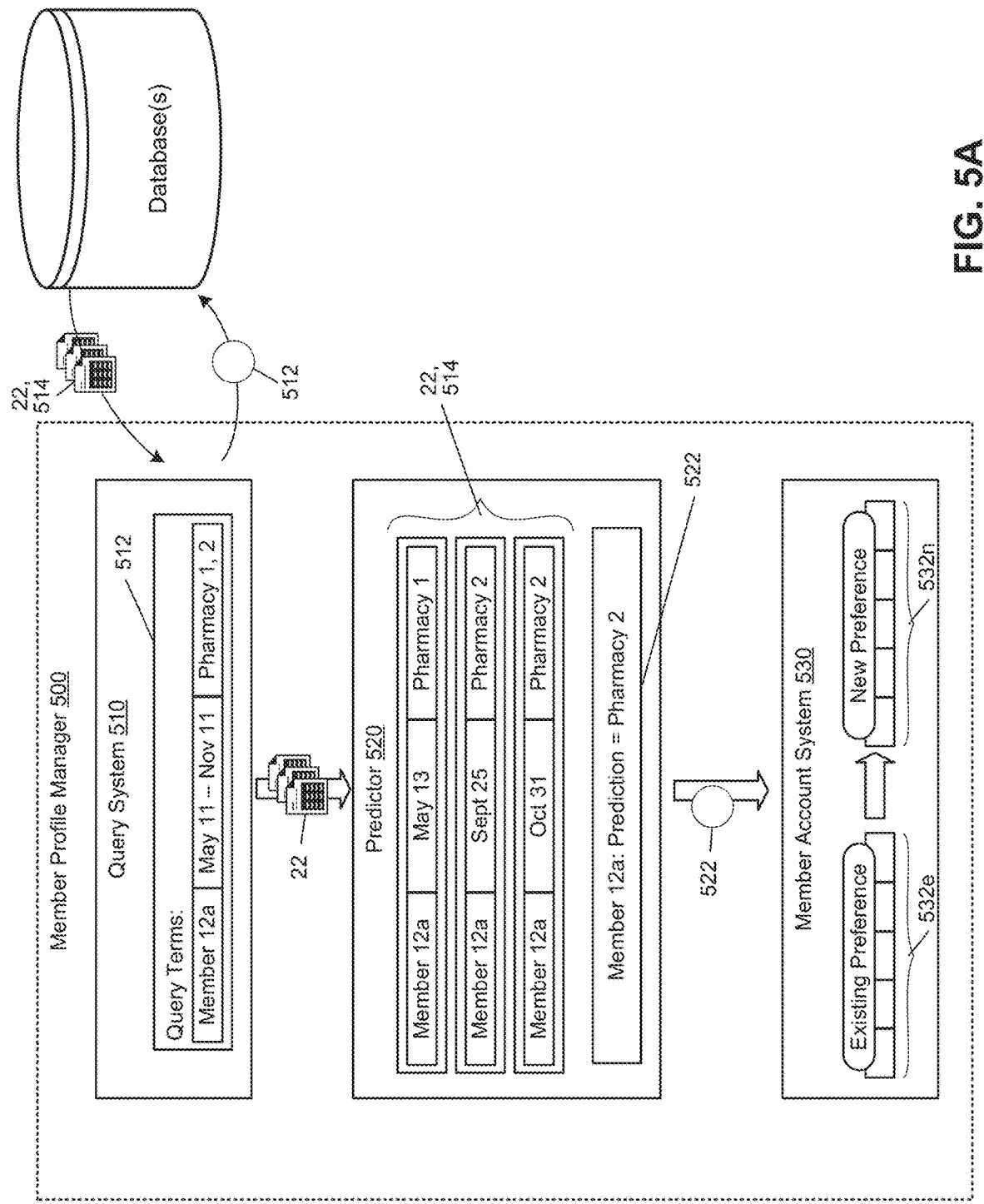
FIGS. 5A-5C are schematic views of example member profile managers that may be deployed in the prediction environment of FIG. 4.
Figure 5B:
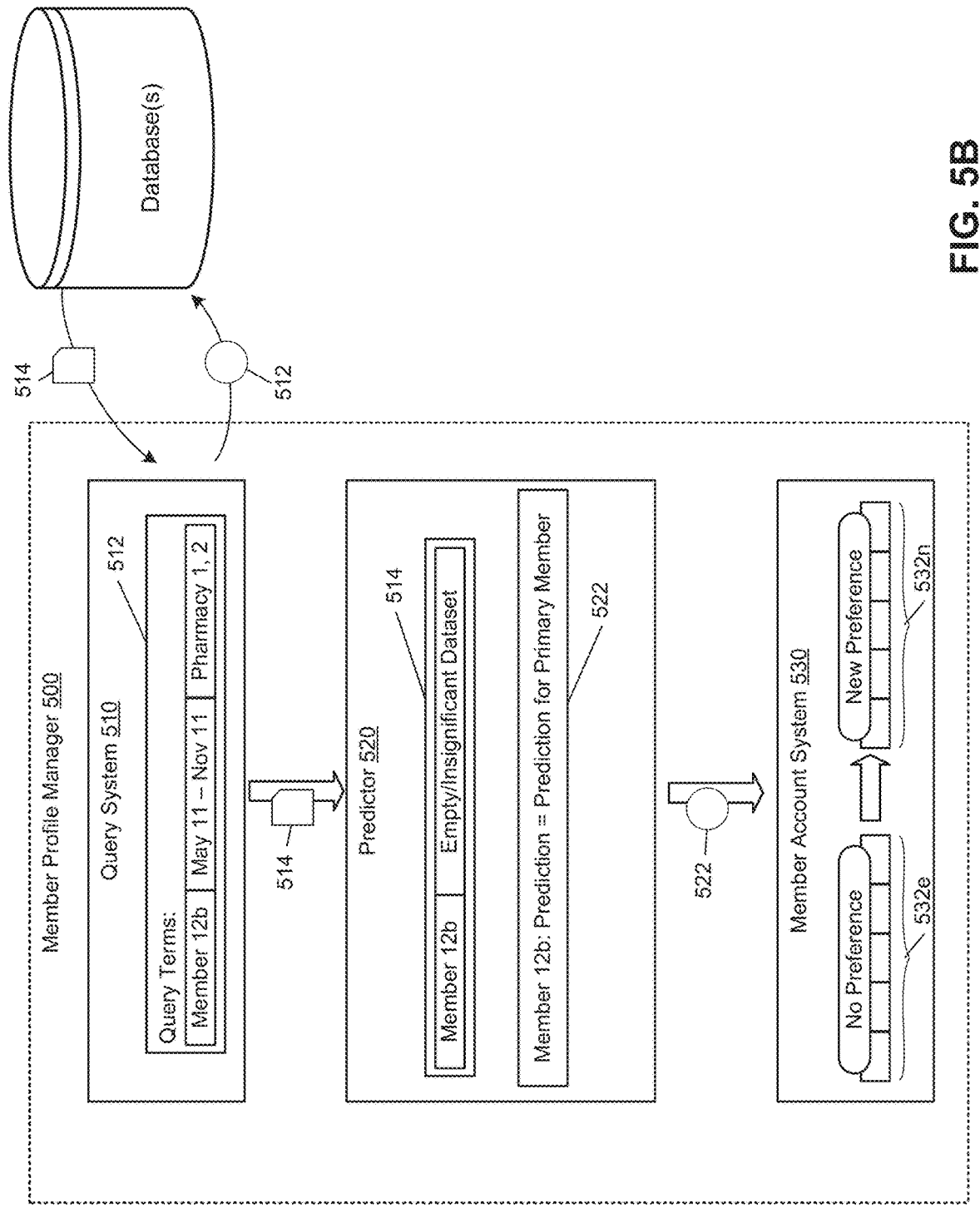
Figure 5C:
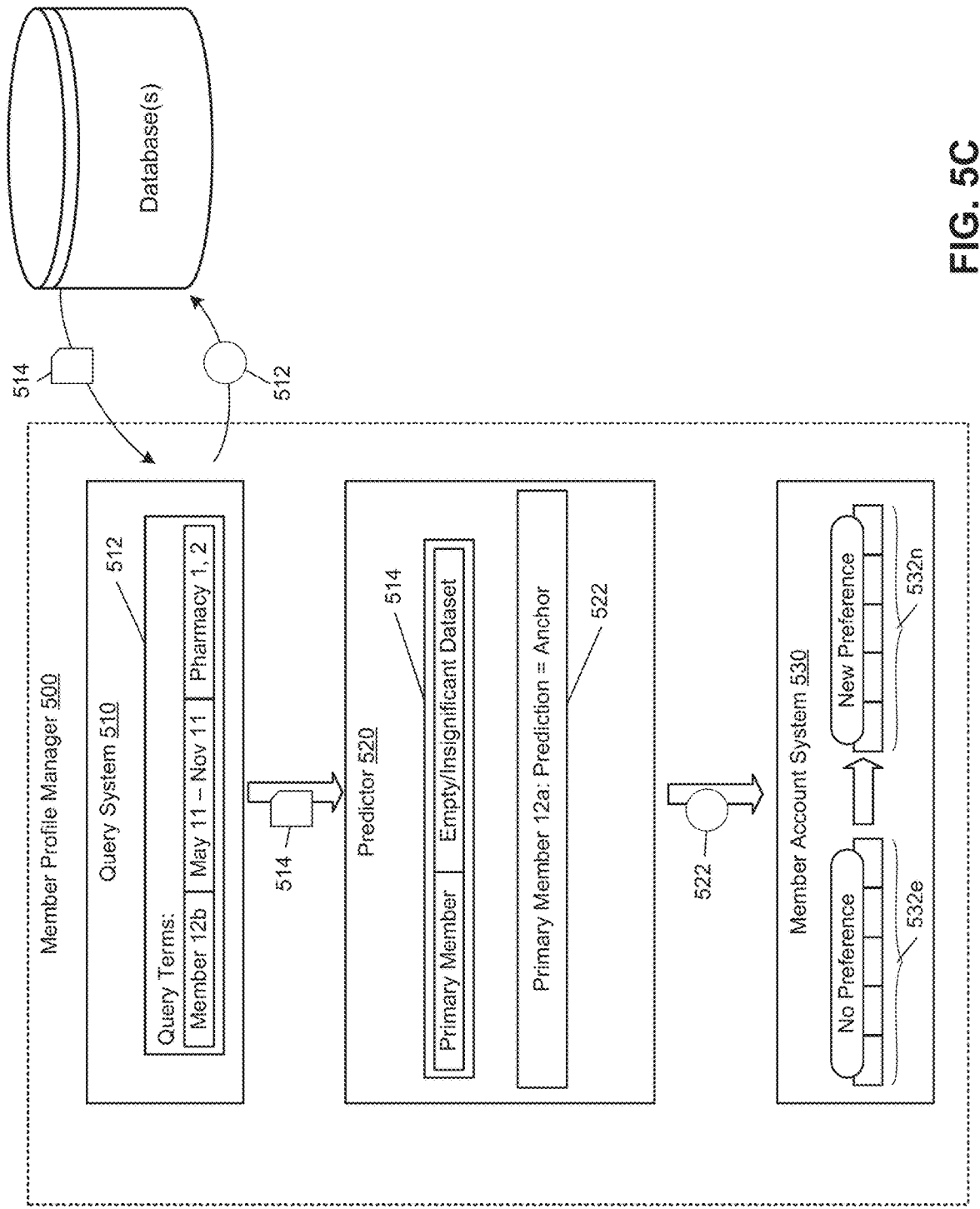

In some implementations, the benefit manager device 102 is used by a member (or a person on behalf of the member) to obtain a precited network provider, such as described in FIGS. 5A-5C, generated by member profile manager 500 and predictor 520. In some implementations, such as those depicted in FIGS. 5A-5C, the benefit manager device 102 includes and/or is communication with the member profile manager 500. In some implementations, the member profile manager 500 includes a query system 510, a predictor 520, and a member account system 530. In some implementations, the query system 510 is configured to obtain a set of historical data 22 that characterizes interactions 14 of a member 12 with one or more network providers. In some examples, the number of network providers that should be included in the obtained data set depends on the number of network providers being offered or available to the member 12 as a provider choice. For example, if the member 12 has the choice of WALGREENS® and CVS® as the pharmacy provider, the query system 510 would obtain a set of historical data 22 that characterizes interactions 14 of the member 12 with either of WALGREENS® or CVS®.

The query system 510 may be configured to obtain the set of historical data 22 in response to an enrollment request to enroll the member group 10 with a set of network providers. With respect to healthcare network policies, there is often an enrollment period that allows the members 12 and/or member group 10 to make changes to their network benefits. For example, during the enrollment period, the member may change or switch their network benefits. Outside of this enrollment period, the member is typically not allowed to alter his or her benefits (e.g., the benefits are locked-in for a year). During this enrollment period, a member group 10 may decide that instead of a network managed at the group level, the member group 10 prefers to manage the network at the individual member level. In this situation, the member group 10 may provide some indication to the network administrator that the group 10 would prefer an individual member managed network. In response to this indication (or enrollment request), the query system 510 is configured to obtain the set of historical data 22 to initiate the deployment of the network being managed at the individual member level.

In some configurations, the query system 510 generates a query 512 for a set of databases (e.g., databases associated with the computing system 30) to obtain the set of historical data 22. When the query system 510 generates the query 512, the query 512 may include a set of query terms to bound the results or response 514 to the query 512. For instance, in order to obtain historical data 22 regarding a particular member 12, the query terms identify the member 12 that is the subject of the query 512. This identifier of the member 12 may be a member name or an identifier associated with the member 12 (e.g., a network policy number assigned to the member 12). In addition to designating the member 12 in the query terms, the query terms may also include the network providers of interest. Here, the term "network providers of interest" refers to the network providers that are available choices for the individual member. As stated previously, if the member 12 has the choice of WALGREENS® and CVS® as the pharmacy provider, the query system 510 would obtain a set of historical data 22 that characterizes interactions 14 of the member 12 with either of WALGREENS® or CVS®; therefore, the query terms for the network providers would be WALGREENS® and CVS®.

In some implementations, in addition to the member 12 and the network provider(s), the query terms also designate a particular time period. Here, by designating a particular time period, the query system 510 ensures that the response 514 that is received from the query 512 is not stale historical data 22. In some implementations it is advantageous to avoid stale historical data 22 because that stale data may no longer be an indicator of the member's preferences. For instance, the member 12 may have moved in the past year. In this scenario, if the query 512 receives historical data 22 from two years ago that indicates that the member 12 frequently went to a WALGREENS® at a particular location, that particular WALGREENS® information would no longer be relevant because the member 12 has moved to a new location where that WALGREENS® is no longer convenient. In order to avoid stale data, in some examples, the query time period is set for a period that captures six months of data.

With the query response 514, the query system 510 is configured to pass the query results 514 to the predictor 520. The predictor 520 receives the historical data 22 from the query response 514 and generates a predicted network provider 522 (also referred to as a predicted preference) that indicates at least one of the network providers of interest. The predictor 520 may then pass the predicted network provider 522 to the member account system 530 such that the member profile manager 500 can communicate the predicted network provider 522 to the member 12.

In some configurations, the predictor 520 is a prediction model such as a machine learning model. Here, depending on the implementation, the predictor 520, as a machine learning model, may be defined via supervised learning. When the predictor 520 uses supervised learning, the predictor 520 may use one or more algorithms configured to build a mathematical model of a set of training data containing one or more inputs (e.g., information from historical data 22) and desired outputs (e.g., a predicted network provider).

The training data may consist of a set of training examples. Each of the training examples have one or more inputs and desired outputs, (i.e., a supervisory signal). Each of the training examples may be represented in the machine learning model by an array and/or a vector (also referred to as a feature vector or embedding). The training data may be represented in the machine learning model by a matrix. The machine learning model may learn one or more functions via iterative optimization of an objective function, thereby learning to predict an output (i.e., a predicted network provider) associated with new inputs. Once optimized, the objective function may provide the machine learning model with the ability to accurately determine an output for inputs other than inputs included in the training data.

In some implementations, the machine learning model may be defined by one or more supervised learning algorithms such as active learning, statistical classification, regression analysis, and similarity learning. Active learning may include interactively querying, by the machine learning model, a member and/or an information source (e.g., a database) to label new data points with desired outputs. Statistical classification may include identifying, by the machine learning model, which set of subcategories (i.e., subpopulations) that a new observation belongs to based on a training set of data containing observations having known categories. Regression analysis may include estimating, by the machine learning model relationships between a dependent variable, (i.e., an outcome variable), and one or more independent variables, (i.e., predictors, covariates, and/or features). Similarity learning may include learning, by the machine learning model, from examples using a similarity function where the similarity function is designed to measure how similar or related two objects are.

In some configurations, the machine learning model may be defined via unsupervised learning. With unsupervised learning one or more algorithms are configured to build a mathematical model of a set of data containing only inputs by finding structure in the data such as grouping or clustering of data points. In some implementations, the machine learning model may learn from test data (i.e., training data) that has not been labeled, classified, or categorized. The unsupervised learning algorithm may include identifying, by the machine learning model, commonalities in the training data and learning by reacting based on the presence or absence of the identified commonalities in new pieces of data. In some examples, the machine learning model may generate one or more probability density functions. In some embodiments, the machine learning model may learn by performing cluster analysis, such as by assigning a set of observations into subsets or clusters according to one or more predesignated criteria, such as according to a similarity metric of which internal compactness, separation, estimated density, and/or graph connectivity are factors.

When the machine learning model is defined by semi-supervised learning, one or more algorithms using the training data may be missing training labels. The semi-supervised learning may be weakly supervised learning where the training labels may be noisy, limited, and/or imprecise. The noisy, limited, and/or imprecise training labels may be cheaper and/or less labor intensive to produce; thus, allowing the machine learning model to train on a larger set of training data for less cost and/or labor.

In some examples, the machine learning model is defined via reinforcement learning where one or more algorithms use dynamic programming techniques. Here, these techniques may train the machine learning model by taking actions in an environment in order to maximize a cumulative reward.

In some instances, the machine learning model may be defined via self-learning. For example, the machine learning model is configured to train using training data with no external rewards and no external teaching, such as by employing a Crossbar Adaptive Array (CAA). The CAA may compute decisions about actions and/or emotions about consequence situations in a crossbar fashion; thereby teaching the machine learning model with interactions between cognition and emotion.

In some configurations, the machine learning model may be defined via feature learning. With feature learning, one or more algorithms for the model are designed to discover increasingly accurate and/or apt representations of one or more inputs provided during training (e.g., training data). Feature learning may include training via principal component analysis and/or cluster analysis. Feature learning algorithms for the machine learning model may attempt to preserve input training data while also transforming the input training data such that the transformed input training data is useful. In some examples, the machine learning model may be configured to transform the input training data prior to performing one or more classifications and/or predictions of the input training data. Thus, the machine learning model may be configured to reconstruct input training data from one or more unknown data-generating distributions without necessarily conforming to implausible configurations of the input training data according to the distributions. In some configurations, the feature learning algorithm may be performed by the machine learning model in a supervised, unsupervised, or semi-supervised manner.

In some implementations, the predictor 520 is configured to determine whether any of the network providers of interest include a restrictive condition with respect to another network provider of interest. For instance, the restrictive condition may be such that one network provider of interest requires exclusivity. This restrictive condition can therefore affect the predicted network provider 522 generated by the predictor 520 because it can limit the number of predictions 520 or limit how those predictions are structured.

In some examples, a network may have multiple network providers for different purposes. To illustrate, in the case of a pharmacy provider, a member may be permitted to have a short-term maintenance pharmacy (e.g., for acute healthcare conditions) and a long-term maintenance pharmacy (e.g., for long-term care) without violating restrictive conditions, such as exclusivity. Stated differently, some restrictive conditions are only constraints (e.g., exclusive constraints) with respect to one type of network provider (e.g., one of a short-term maintenance pharmacy or the long-term maintenance pharmacy). Yet still there may be particular network providers who have restrictive conditions that constrain the member 12 to a single network provider that will function as multiple or all types of network providers (e.g., both the short-term maintenance pharmacy and the long-term maintenance pharmacy). In either situation, the predictor 520 may determine whether one or more network providers of the network providers of interest (i.e., the available network providers) include such a restrictive condition. With this determination, the predictor 520 can help ensure it is predicting a network provider that does not violate any restrictive conditions.

When generating the predicted network provider 522, the predictor 520 may be configured to apply certain weights or rules to the historical data 22 (e.g., during or prior to prediction). For example, FIGS. 5A-5C illustrates that the predictor 520 receives historical data 22 corresponding to three data records for the first member 12a. A first portion of the query result 514 is a data record of the first member 12a using Pharmacy 1 on May 13. A second portion of the query result 514 is a data record of the first member 12a using Pharmacy 2 on September 25. A third portion of the query result 514 is a data record of the first member 12a using Pharmacy 2 on October 23. In some examples, such as FIG. 5A, the predictor 520 applies a weight that reduces the significance of historical data 22 that is the least recent. Similarly, when the historical data 22 is most recent, it may have the greatest significant weight applied to it in order for its influence upon the predicted network provider 522 to be greater than the least recent historical data 22. In this example, that means that the predictor 520 reduces the influence (or weight) of the May 13 entry the most and the influence (or weight) of the October 31 entry the least.

Another rule that the predictor 520 may use to influence its prediction is the frequency of network providers. For example, the predictor 520 may apply a weight that causes network providers that appear with the greatest frequency in the historical data 22 to have a greater influence on the predicted network provider 522 than network providers that appear with lessor frequency. Applying this rule to the example would mean that Pharmacy 2, which appears twice in the query results 514 would have a greater influence or weight on the predicted network provider 522 by the predictor 520 than Pharmacy 1, which appears one time. These rules or weights that influence the predicted network provider 522 may be applied independently, in a compound fashion, or even by a set of hybrid rules that are time-based and frequency-based. For instance, both frequency and time may be weighted with frequency having a greater weight or influence on the predicted network provider 522 than time (or vice versa).

In some situations, such as FIGS. 5B and 5C, the query system 510 may obtain little to no historical data 22 for a particular member 12. For example, when a set of members 12 are a household where there is a primary member 12 (also referred to as a cardholder or policy holder) and one or more secondary members 12, the secondary members 12 may be younger dependents that have not interacted with network providers (e.g., with pharmacies). In this situation, there may be default rules for the predicted provider preference for these members 12. To provide an example, in response to the query 512, the predictor 520 receives an empty data set as the set of historical data 22 for the particular member 12. In this example, the predictor 520 generates the predicted network provider 522 to match a predicted network provider 522 for another member 12 associated with the group of members 12 that include the particular member 12. In some situations, a secondary member 12 that does not have a threshold amount of historical data 22 for the predictor 520 to generate a prediction, will have a default prediction that matches the prediction of the primary member 12. Here, the threshold amount of historical data 22 may refer to a statistically significant amount of historical data 22 for purposes of generating the predicted network provider 522.

In some circumstances, such as FIG. 5C, even the primary member 12 of a household may not have an adequate amount of historical data 22 in order to generate a predicted network provider 522. For instance, the primary member 12 may be a new member of a network. In these circumstances, the predicted network provider 522 may default to an anchor network provider. In these examples, an anchor network provider may refer to the network provider that has been designated as the anchor network provider of the member group (i.e., at the member group level). In some implementations, there are multiple anchor network providers and the primary member chooses between the anchor network providers.

As shown in FIGS. 5A-5C, the member account system 530 is configured to receive the predicted network provider 522 from the predictor 520. The member account system 530 generally includes configuration data 532 (e.g., existing configuration data 532e or new/updated configuration data 532n) that can be compiled or represented as aspects of a member's data profile (e.g., as a graphical user interface (GUI) for members 12). In some examples, the member 12 already has an established network provider. In these examples, the member account system 530 may automatically replace the existing network provider or request authorization to replace the existing network provider (e.g., as shown in FIG. 5A). For instance, the request for authorization to replace the existing network provider generates a message prompt (e.g., as a set of GUI elements) for the member 12 that inquires whether the member 12 wants to use a recommended network provider preference that corresponds to the predicted network provider 522 from the predictor 520. In some implementations, this message is capable of receiving user input to accept or deny the request. When the member 12 accepts the request, the member account system 530 may identify the existing configuration data 532e that corresponds to the existing network provider and replace or change that configuration data 532 (e.g., into new/updated configuration data 532n) to represent the recommended network provider preference as the new network provider. Here, by changing the configuration data 532 accordingly, a member interface that depicts the member's network profile and network preferences may update to display the new network provider.

In some implementations, such as FIGS. 5B and 5C, the profile for the member 12 does not include a network provider preference (e.g., shown as "no preference"). In these implementations, the member account system 530 may automatically update the existing configuration data 532e to generate the recommended network provider preference as the new network provider preference.

In some configurations, even when the member account system 530 automatically generates the predicted network provider 522 as the new network provider preference, the member 12 may still be able to manually override this provider preference (e.g., during the enrollment period). When the member 12 manually overrides the predicted network provider 522 represented as the recommended network provider preference, the member 12 may be able to manually select from other offered network providers to configure their own preferences. By allowing this override feature for the member 12, the member 12 enables the predicted network provider 522 of the member profile manager 500 to have feedback. In some examples, the predictor 520 may use this feedback to further its learning (e.g., to fine tune a machine learning model) or to generate a greater corpus of training examples that are accurately labeled by the member 12 as their true preference (i.e., are a known ground truth). In some instances, training examples generated by this feedback loop become part of or supplant validation examples that are used to validate a trained machine learning model's capability.

Figure 6A:
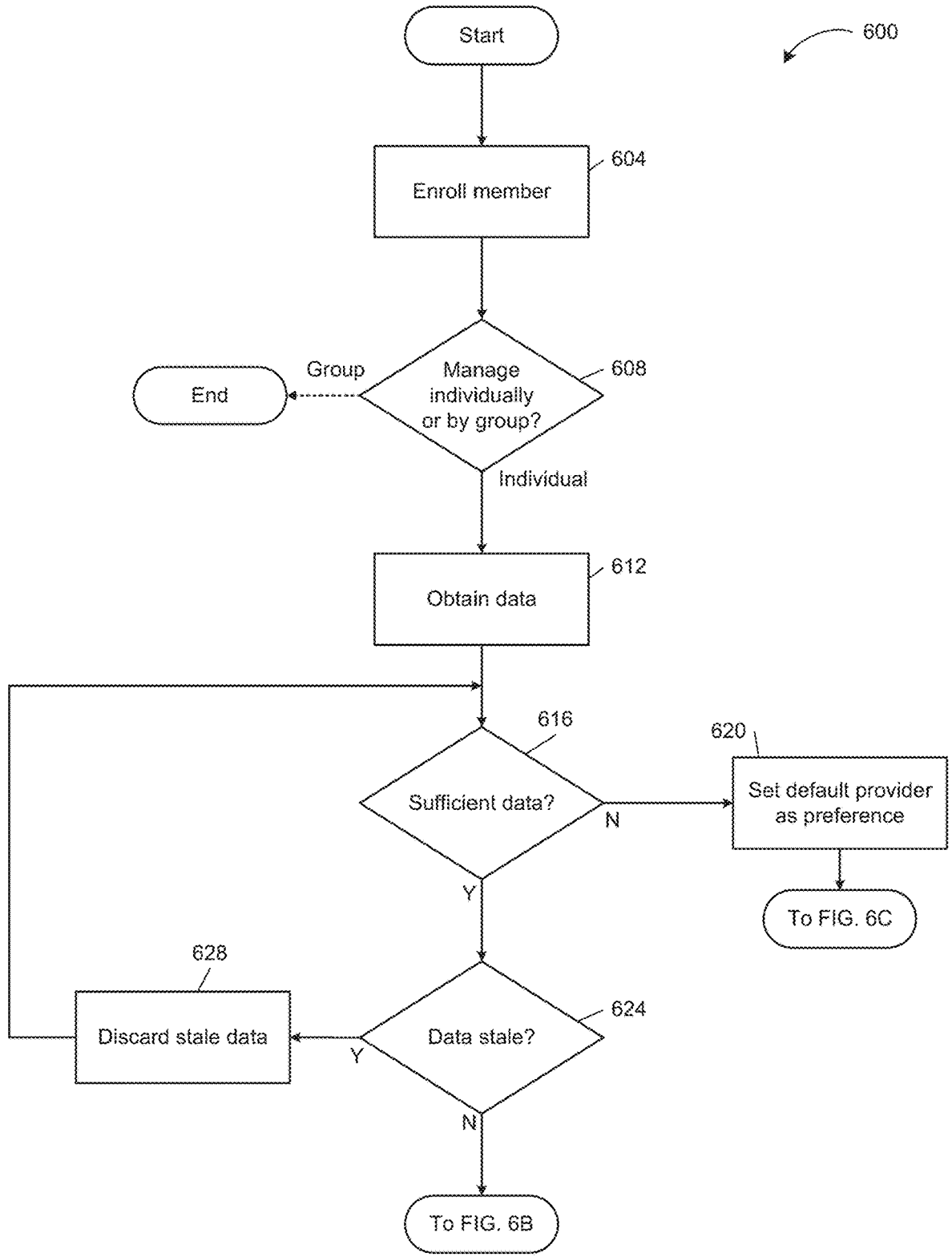
FIGS. 6A-6C are a flowchart of an example prediction method.
Figure 6B:
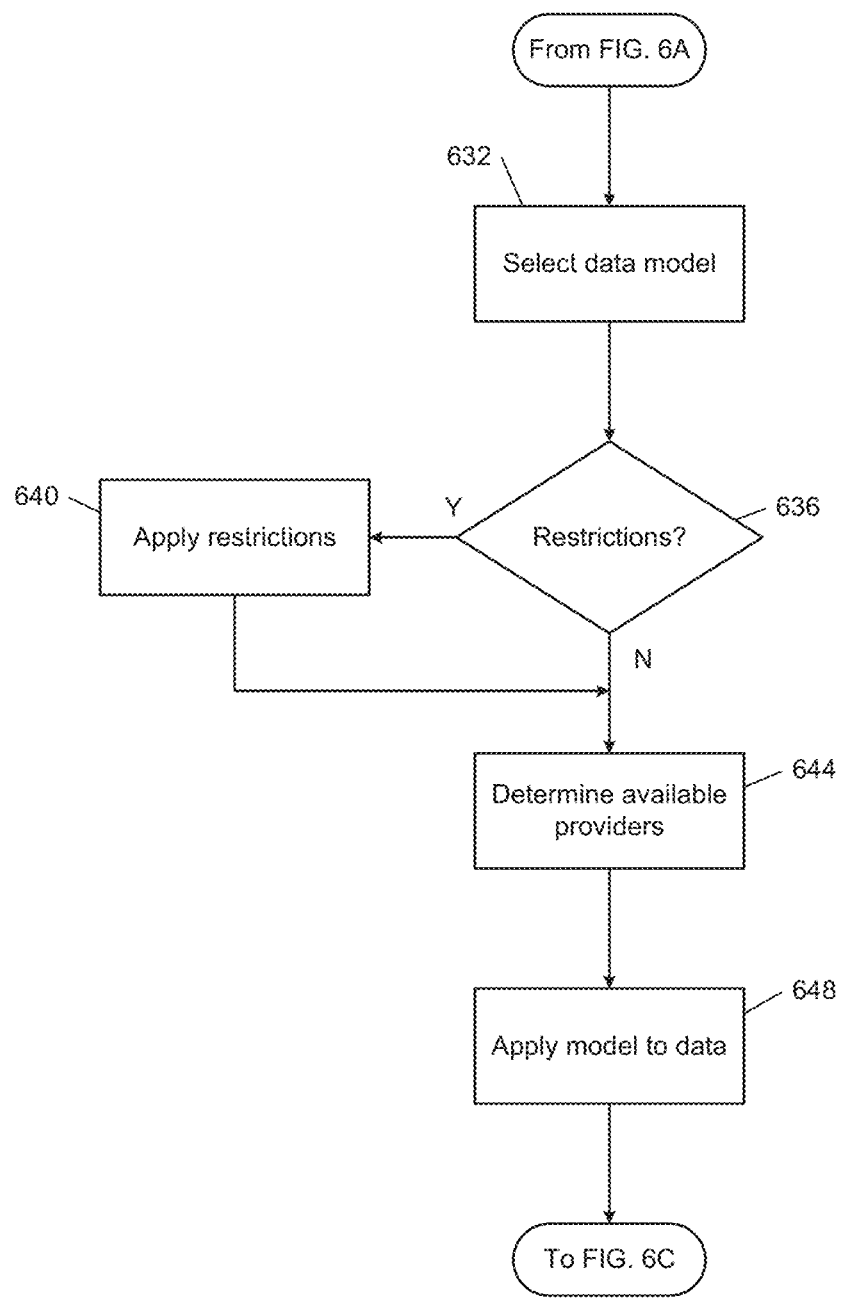
Figure 6C:
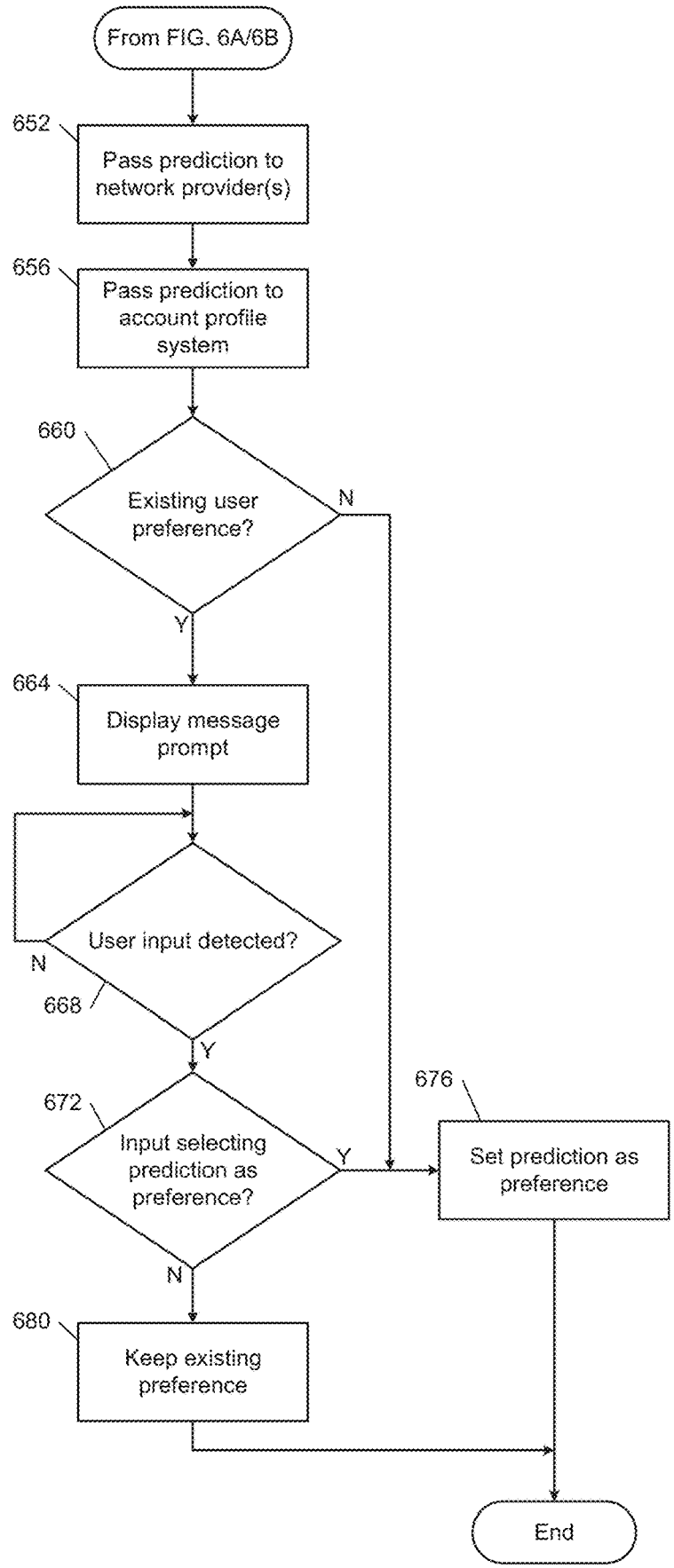

FIGS. 6A-6C are a flow diagram of example method 600 for providing a user with a network provider prediction. At 604, control detects an enrollment request. At 608, control determines whether the enrollment request includes a request to manage the member individually or by group. If the enrollment request includes a request for providers to be managed by group, control may end and no prediction is made. In some embodiments, a default provider is suggested to the user or added automatically. At 608, if the enrollment request includes a request for providers to be managed at an individual level, control continues to 612. At 612, member data is obtained, such a set of historical data 22 or interactions 14. At 616, if there is not sufficient data to make a provider prediction, a defaulter provider is used at 620, and control may end. In some implementations, control continues to 652 as if the default provider was a prediction. If there is sufficient data, control continues to 624. At 624, the age of the data is checked. If portions of the data are stale (older than a specified threshold) control continues to 628 and the stale data is discarded. Control then returns to 616. If there is no stale data, control continues to 632.

At 632, a data model is selected such as those described with respect to FIGS. 5A-5C. In some implementations, data model is selected based on the type of data, a network and/or client preference, which data model will provide the quickest prediction, and/or the most accurate prediction. In some implementations, data model selection is optional because a data model is specified before the enrollment request is received. In either case, control continues to 636. At 636, control determines whether the network has restrictions on which providers are available to the member. If there are no restrictions, control continues to 644. If there are restrictions, control continues to 640 and the restrictions are added as rules to the model. After 640, control continues to 644. At 644, control determines which providers are available to a member based on the insurance network. At 648, the predicted network provider 522 is generated using the data model and any other additional rules.

At 652, the prediction is provided to the network providers and at 656 the prediction is passed to the member account system 530. At 660, control determines whether an existing user preference exists. If no user preference exists, control continues to 676, and the prediction is automatically set as the user preference without user interaction. At 660, if a user preference does exist, control continues to 664 where a prompt is displayed to the user to accept or reject the prediction as a user preference. At 668, control waits for a user input. If no user input is detected, control remains at 668. If user input is detected, control continues to 672 and control determines whether the user input accepted or rejected the prediction as a user preference. If the user accepted the preference, control continues to 676 and sets the prediction as the preference. If the user rejected the prediction, control moves to 680 and keeps existing user preference.

Machine Learning Model Training

Figure 7:
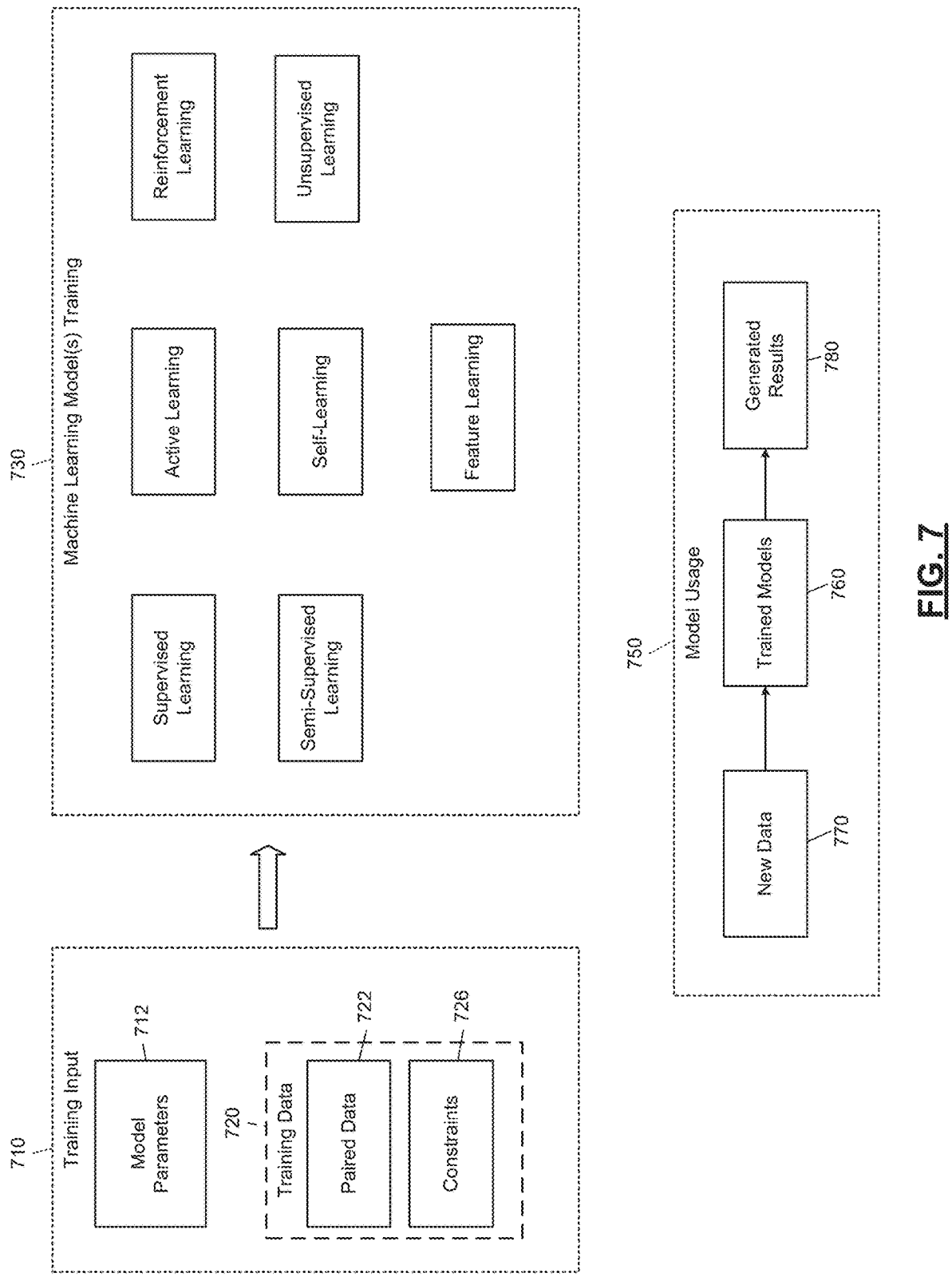
FIG. 7 is a functional block diagram of example machine learning model training and usage, which may be deployed in the method of FIGS. 6A-6C.

FIG. 7 is a block diagram of an example service that may be deployed within the predictor 520 of FIGS. 5A-5C. Training input 710 includes model parameters 712 and training data 720, which may include paired training data sets 722 (e.g., input-output training pairs) and constraints 726. Model parameters 712 represents storing and/or providing the parameters or coefficients of corresponding ones of machine learning models. During training, the parameters 712 are adapted based on the input-output training pairs of the training data sets 722. After the parameters 712 are adapted (after training), the parameters are used in 750 by trained models 760 to implement the trained machine learning models on a new set of data 770.

Training data 720 includes constraints 726 which may define the constraints of a given member's information features. The paired training data sets 722 may include sets of input-output pairs, such as pairs of a plurality of member preferences and features of entities associated with providers. Some components of training input 710 may be stored separately at a different off-site facility or facilities than other components.

Machine learning model(s) training 730 trains one or more machine learning techniques based on the sets of input-output pairs of paired training data sets 722. For example, the model training 730 may train the machine learning (ML) model parameters 712 by minimizing a loss function based on one or more ground truth data. The training 730 may include supervised learning, semi-supervised learning, active learning, self-learning, feature learning, reinforcement learning, and unsupervised learning.

The ML models can include any one or combination of classifiers or neural networks, such as an artificial neural network, a convolutional neural network, an adversarial network, a generative adversarial network, a deep feed forward network, a radial basis network, a recurrent neural network, a long/short term memory network, a gated recurrent unit, an auto encoder, a variational autoencoder, a denoising autoencoder, a sparse autoencoder, a Markov chain, a Hopfield network, a Boltzmann machine, a restricted Boltzmann machine, a deep belief network, a deep convolutional network, a deconvolutional network, a deep convolutional inverse graphics network, a liquid state machine, an extreme learning machine, an echo state network, a deep residual network, a Kohonen network, a support vector machine, a neural Turing machine, etc.

Particularly, a first ML model of the ML models can be applied to a training batch of member preferences to estimate or generate a prediction of provider choice for a particular member. In some implementations, a derivative of a loss function is computed based on a comparison of an estimate with ground truth entities, and parameters of the first ML model are updated based on the computed derivative of the loss function. The result of minimizing the loss function for multiple sets of training data trains, adapts, or optimizes the model parameters 712 of the corresponding first ML model. In this way, the first ML model is trained to establish a relationship between member data and member selections.

After the machine learning models are trained, new data 770, including one or more sets of features for members, are received and/or derived from a document being accessed from the storage device 110. The first trained machine learning model may be applied to the new data 770 to generate results 780 including a prediction of one or more preferences.

Machine Learning Network

Figure 8A:
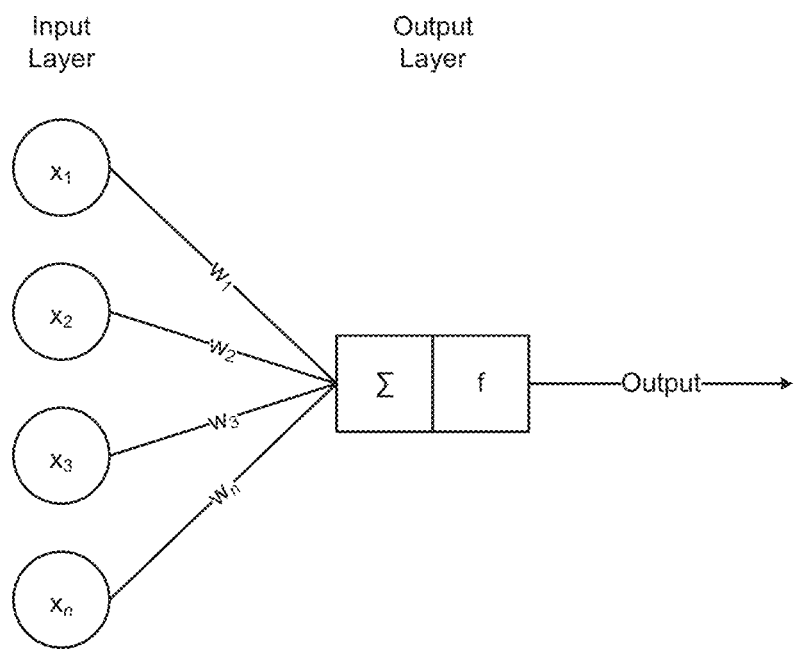
FIGS. 8A-8B are functional block diagrams of an example neural network.
Figure 8B:
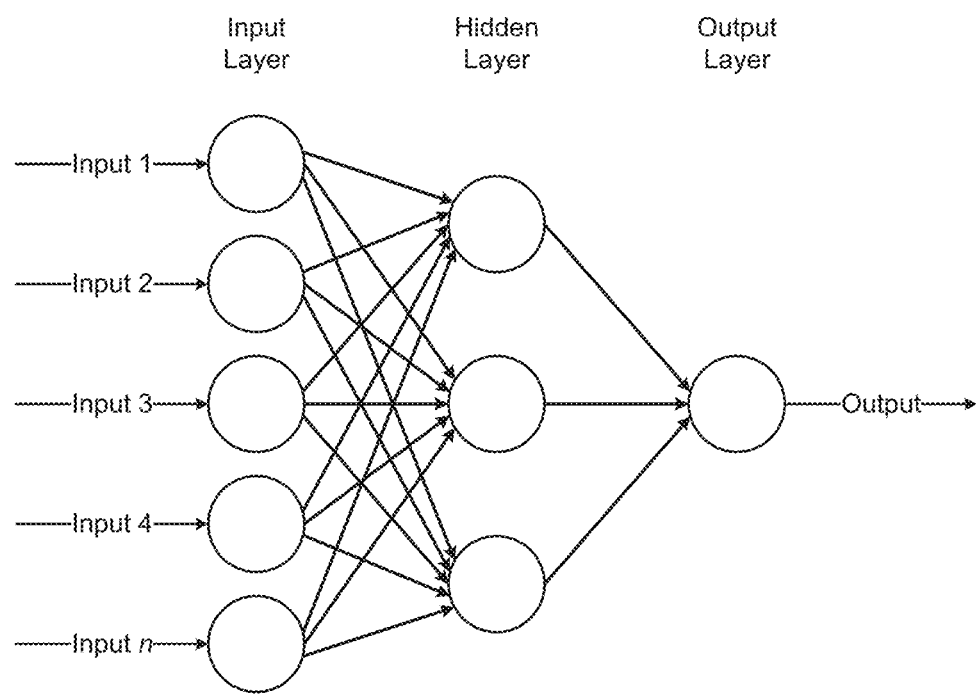

FIG. 8A is a graphical representation of an example neural network with no hidden layers for implementing a machine learning module. FIG. 8B is a graphical representation of an example neural network with one hidden layer for implementing the machine learning module. In machine learning, a neural network—or an artificial neural network—is a network or circuit of artificial neurons or nodes having at least an input layer and an output layer. In various implementations, neural networks may also have one or more hidden layers. Neural networks may be used in deep learning applications to allow computer systems to solve artificial intelligence problems—such as problems in predictive modeling, pattern recognition, and dynamic control systems.

As previously discussed, FIG. 8A shows a neural network without any hidden layers. The neural network of FIG. 8A may also be referred to as a single-layer perceptron. The neural network of FIG. 8A is shown with an input layer including n nodes, labeled $x_1$, $x_2$, $x_3$, and $x_n$. While only four nodes are illustrated in FIG. 8A, the input layer may have any number of nodes. In various implementations, each node may represent any numerical value. For example, each node may represent a numerical value in a range of between 0 and 1. So, for example, the nodes of the input layer could be expressed in interval notation as: $x_1 \in [0,1]$, $x_2 \in [0,1]$, $x_3 \in [0,1]$, and $x_n \in [0,1]$. In various implementations, the input variables to a neural network may be expressed as a vector i having n dimensions. In the example of FIG. 8AC, input vector i may be represented by equation (1) below:

$$i = \langle x_1, x_2, x_3, x^n \rangle. \tag{1}$$

Each of the nodes may be multiplied by a weight—represented by $w_1$, $w_2$, $w_3$, and $w_n$ in FIG. 8A—before being fed into a node in the next layer. In FIG. 8A, because there are no hidden layers, the next layer is the output layer. For simplicity of illustration, only a single node is shown in the output layer of FIG. 8A. However, the output layer may include any number of nodes.

At the node in the next layer, the inputs of the node are summed. Thus, because the inputs of the node in the output layer of FIG. 8A are the numerical value of each of the nodes of the previous layer multiplied by a weight, the summation Σ may be represented by equation (2) below:

$$\Sigma = x_1 w_1 + x_2 w_2 + x_3 w_3 + x_n w_n \tag{2}$$

In various implementations, a bias b may be added to the nodes x of the previous layer after they have been multiplied by a weight w. For example, if biases b are added, then summation Σ may be represented by equation (3) below:

$$\Sigma=(x_1w_1+b_1)+(x_2w_2+b_2)+(x_3w_3+b_3)+(x_nw_n+b_n) \quad (3)$$

The summation Σ may then be fed into an activation function ƒ. The activation function ƒ may be any mathematical function suitable for calculating an output for the node. Example activation functions ƒ may include linear or non-linear functions, step functions such as the Heaviside step function, derivative or differential functions, monotonic functions, sigmoid or logistic activation functions, rectified linear unit (ReLU) functions, and/or leaky ReLU functions. The output of the function ƒ is then the output of the node. In a neural network with no hidden layers—such as the single-layer perceptron shown in FIG. 8A—the output of the nodes in the output layer are the output variables or output vector of the neural network.

As illustrated in FIG. 8B, the neural network may include one or more intermediate layers—referred to as hidden layers—between the input layer and the output layer. The neural network of FIG. 8B may be referred to as a multilayer perceptron. Each node of a hidden layer may be connected to one or more nodes of the previous layer and receive inputs from the connected nodes of the previous layer—such as the value of the node of the previous layer multiplied by a weight ($x_nw_n$) or the value of the node of the previous layer multiplied by a weight with a bias added ($x_nw_n+b_n$). Each node of the hidden layer may then function in a manner analogous to the node of the output layer of FIG. 8A by summing the inputs, feeding the summed inputs into an activation function, and feeding the output of the activation function into one or more nodes of the next layer. Similarly, the nodes of the output layer function in a manner analogous to the node of the output layer of FIG. 8A. For example, the nodes of the output layer may receive the outputs of the nodes of the previous layer (multiplied by a weight and/or with a bias added as desired) as inputs, sum the received inputs, feed the summed inputs to an activation function, and output the result of the activation function as an output of the neural network.

In various implementations, the neural network may have any number of hidden layers. In various implementations, each node of a previous layer may be connected to any number of nodes of a next layer. For example, as shown in FIG. 8B, each node of the previous layer may be connected to each node of the next layer. Such a neural network may be referred to as a fully-connected neural network. In various implementations, each layer of the neural network may have any number of nodes. In various implementations, a neural network with no hidden layers may function as a linear classifier and be suitable for representing linearly separable decisions or functions. In various implementations, neural networks with one hidden layer may be suitable for performing continuous mapping from one finite space to another. In various implementations, neural networks with two hidden layers may be suitable for approximating any smooth mapping to any level of accuracy.

Figure 8C:
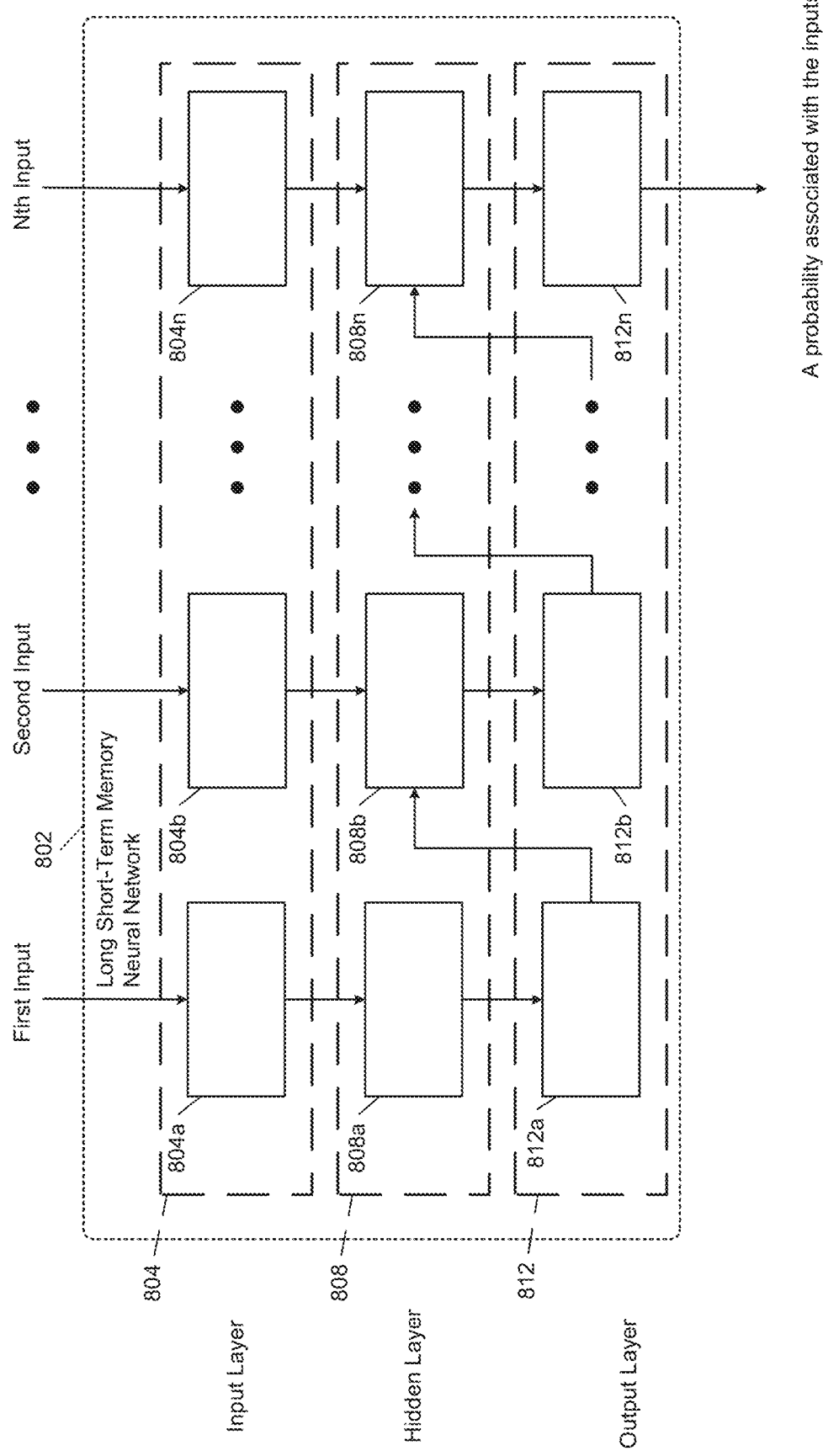
FIG. 8C is a functional block diagram of an example long short-term memory neural network, which may be deployed in the method of FIGS. 6A-6C.

FIG. 8C is a functional block diagram of an example neural network 802 that can be used for the predictor 520 as described herein to produce a predictive model. The predictive model can generate network provider predictions. In some implementations, the neural network 802 can be a long short-term memory (LSTM) neural network. In some implementations, the neural network 802 can be a recurrent neural network (RNN). The example neural network 802 may be used to implement the machine learning as described herein, and various implementations may use other types of machine learning networks. The neural network 802 includes an input layer 804, a hidden layer 808, and an output layer 812. The input layer 804 includes inputs 804a, 804b . . . 804n. The hidden layer 808 includes neurons 808a, 808b . . . 808n. The output layer 812 includes outputs 812a, 812b . . . 812n.

Each neuron of the hidden layer 808 receives an input from the input layer 804 and outputs a value to the corresponding output in the output layer 812. For example, the neuron 808a receives an input from the input 804a and outputs a value to the output 812a. Each neuron, other than the neuron 808a, also receives an output of a previous neuron as an input. For example, the neuron 808b receives inputs from the input 804b and the output 812a. In this way the output of each neuron is fed forward to the next neuron in the hidden layer 808. The last output 812n in the output layer 812 outputs a probability associated with the inputs 804a-804n. Although the input layer 804, the hidden layer 808, and the output layer 812 are depicted as each including three elements, each layer may contain any number of elements. Neurons can include one or more adjustable parameters, weights, rules, criteria, or the like.

In various implementations, each layer of the neural network 802 must include the same number of elements as each of the other layers of the neural network 802. For example, training features may be processed to create the inputs 804a-804n.

The inputs 804a-804n can include fields of the historical data 22 and interactions 14 as data features (binary, vectors, factors or the like) stored in the storage device 110. The features of the historical data 22 can be provided to neurons 808a-808n for analysis and connections between the known facts. The neurons 808a-808n, upon finding connections, provides the potential connections as outputs to the output layer 812, which determines potential providers.

In some examples, a convolutional neural network may be implemented. Similar to neural networks, convolutional neural networks include an input layer, a hidden layer, and an output layer. However, in a convolutional neural network, the output layer includes one fewer output than the number of neurons in the hidden layer and each neuron is connected to each output. Additionally, each input in the input layer is connected to each neuron in the hidden layer. In other words, input 804a is connected to each of neurons 808a, 808b . . . 808n.

The initial model that is built can be built in a secure environment using health data relating to patients. The initial model can then be refined based on feedback with a computing system that also is in a secure environment. The health data, e.g., the patient name, drug name, dosing data, and other prescription information, is always within a secure computing environment and not communicated out to a public data base and subjected to a third-party artificial intelligence. The secure computing system mitigates the risk of working with protected health data and other types of high-risk data, e.g., personal identifying information, and/or state protected data. In an example, the secure computing system is a mainframe computer with limited connection to external systems. In an example, the computing system is a private cloud environment that provides high-performance, secure, and flexible computing environments enabling the analysis of sensitive datasets restricted by federal privacy laws, proprietary access agreements, or confidentiality requirements. A private cloud environment can provide creation of any combination of network, CPU, RAM, and storage components into resource groups that can be used to build multi-tenant, multi-site infrastructure as a service.

Example User Interfaces

Figure 9A:
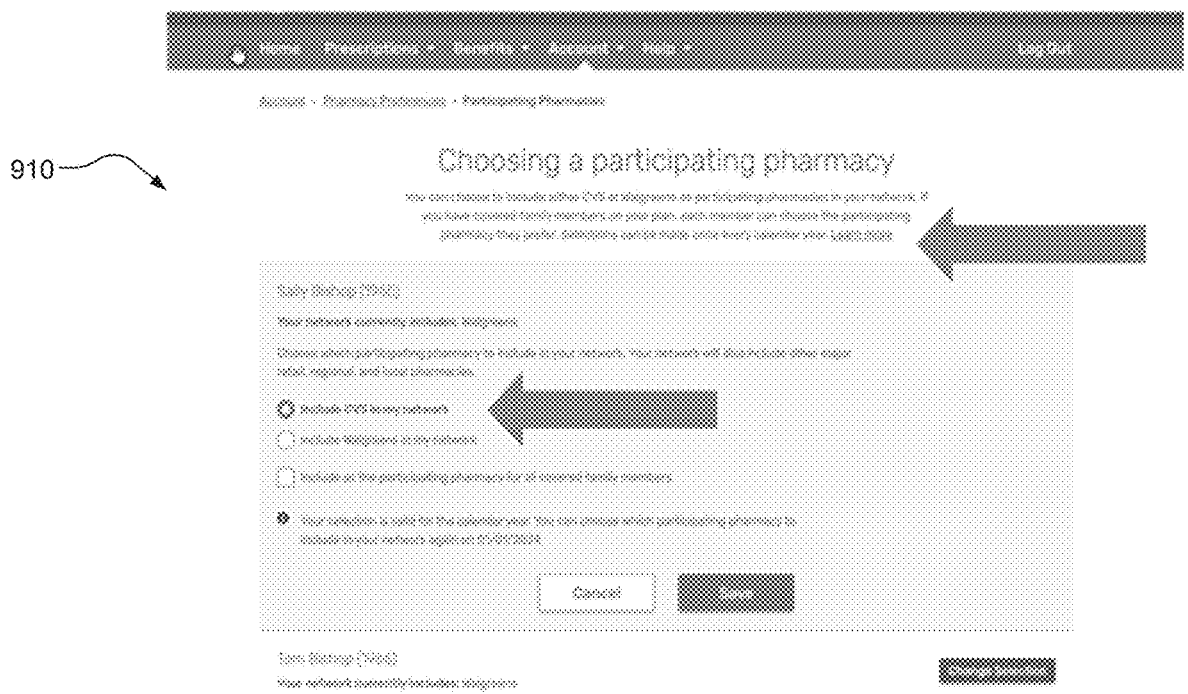
FIGS. 9A-9C are example user interfaces, which may be deployed in the method of FIGS. 6A-6C.
Figure 9B:
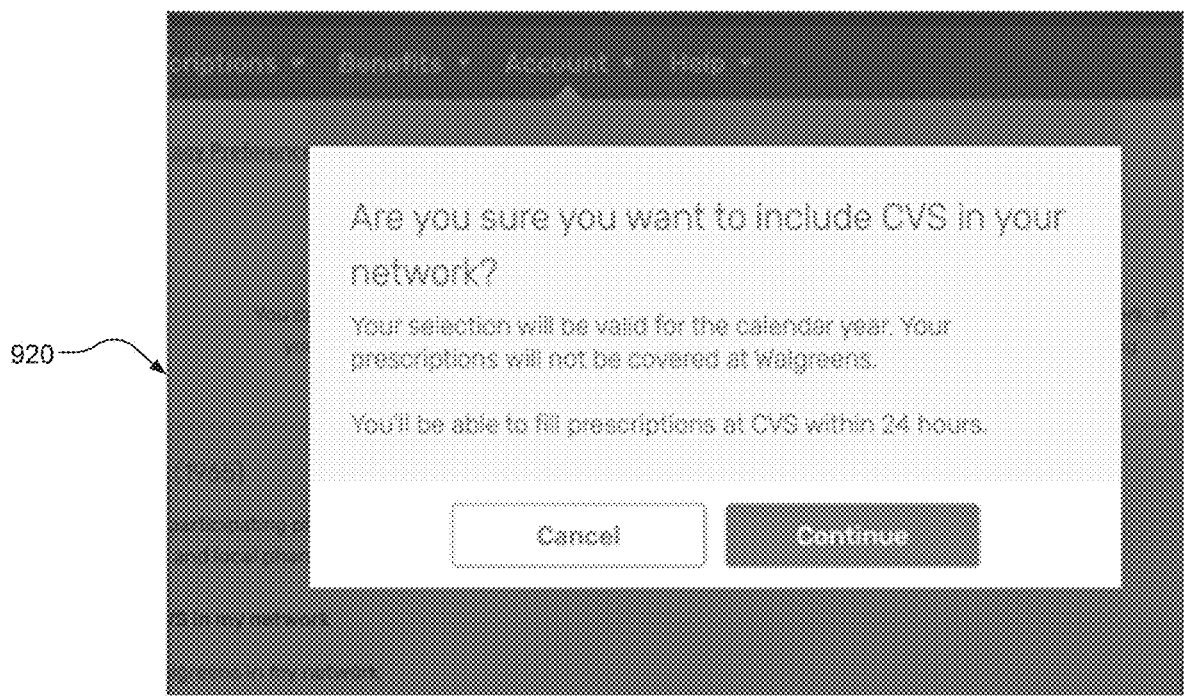
Figure 9C:
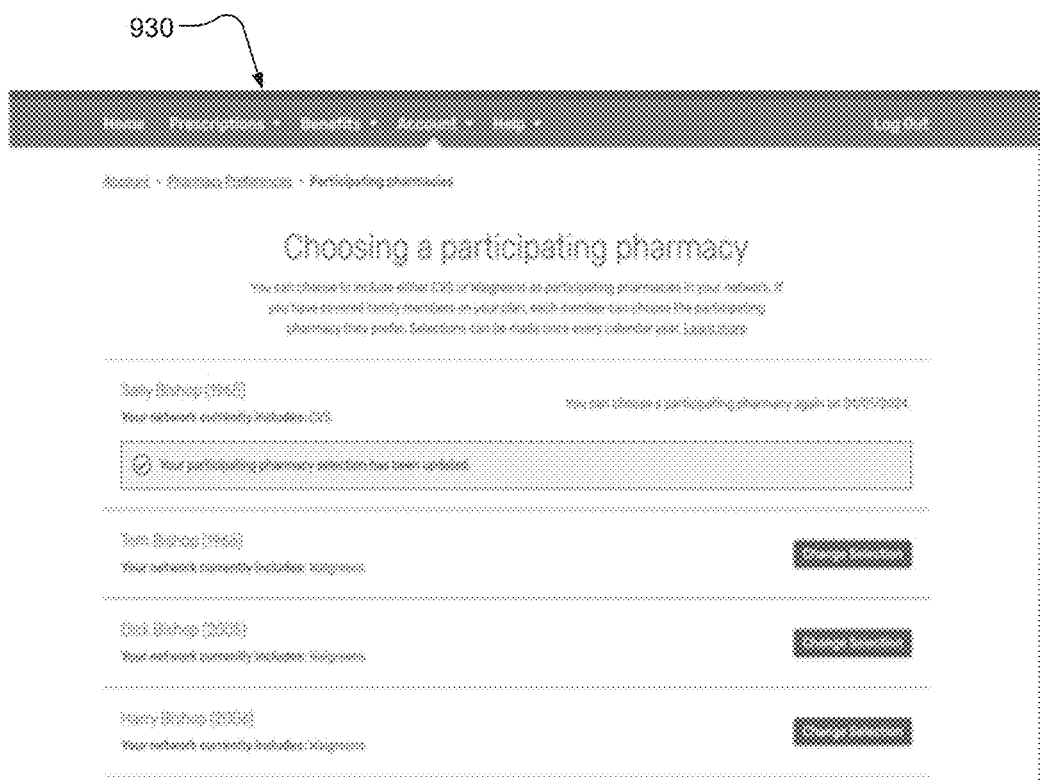

FIG. 9A depicts a user interface 910, showing how account information is displayed to a primary member. A user can initiate an enrollment request from the user interface 910 and/or manage an existing provider preference. FIG. 9B depicts a user interface 920, which includes a prompt to confirm a user preference and/or confirm or reject acceptance of a provider suggestion (or prediction) from the predictor 520. User interface 910 is transformed into user interface 920 in response to detecting a preference change and/or a provider prediction. In FIG. 9C, a user interface 930 is displayed, which confirms that a user preference has changed.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code and memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A computerized method comprising:
    obtaining a set of historical data characterizing interactions of a user with a first network provider and a second network provider, wherein:
        a first healthcare network includes the first network provider and the second network provider,
        configuration data corresponding to an account of the user includes a network provider preference associated with the first healthcare network,
        the first network provider includes a restrictive condition with respect to the second network provider,
        the restrictive condition is set by the first network provider, and
        the restrictive condition indicates that the network provider preference is constrained to one of the first network provider or the second network provider;
    generating, using the set of historical data, a predicted network provider indicating one of the first network provider or the second network provider; and
    communicating the predicted network provider as a recommended network provider preference for the configuration data corresponding to the account of the user,
    wherein generating the predicted network provider includes:
        determining whether the set of historical data has met a sufficiency threshold,
        in response to a determination that the set of historical data has not met the sufficiency threshold, generating a default prediction,
        in response to a determination that the set of historical data has met a sufficiency threshold, determining whether a subset of historical data is within a threshold age, and
        in response to a determination that the subset of historical data is within the threshold age:
            selecting a data model of a set of data models, and
            supplying the restrictive condition to the selected data model as a rule.

2. The computerized method of claim 1, wherein the recommended network provider preference is manually overridable by the user at a graphical user interface (GUI).

3. The computerized method of claim 1, wherein obtaining the set of historical data characterizing interactions of the user with the first network provider and the second network provider includes querying a set of databases including the set of historical data using query terms that include the user, the first network provider, and the second network provider.

4. The computerized method of claim 3, further comprising:
    in response to the query, receiving an empty data set as the set of historical data,
    wherein generating the predicted network provider includes generating, the predicted network provider to match a predicted network provider for a second user associated with a group of users that include the user.

5. The computerized method of claim 4, wherein the second user has a non-empty data set of historical data.

6. The computerized method of claim 1, wherein obtaining the set of historical data characterizing interactions of the user with the first network provider and the second network provider is in response to an enrollment request to enroll a user group with a plurality of network providers.

7. The computerized method of claim 6, wherein:
the user group includes a plurality of sets of users,
a respective set of users includes more than one user sharing a relationship attribute, and
the more than one user includes the user.

8. The computerized method of claim 1, further comprising:
receiving an enrollment request for a group of users including the user, wherein:
the enrollment request requests enrollment with a set of network providers, and
the set of network providers includes the first network provider and the second network provider; and
determining that the first network provider of the set of network providers includes the restrictive condition with respect to the second network provider of the set of network providers.

9. The computerized method of claim 8, further comprising receiving an enrollment request to switch a user group from a single network provider to a plurality of network providers, wherein:
the user group includes a plurality of sets of users,
at least one set includes more than one user sharing a relationship attribute,
the at least one set includes the user, and
the set of network providers includes the first network provider and the second network provider.

10. The computerized method of claim 1, further comprising receiving a request to change a user group that includes the user from a first configuration data policy to a second configuration data policy, wherein:
the first configuration data policy has a first data state where each user of the user group includes an identical network provider preference as configuration data, and
the second configuration data policy has a second data state where the user group includes network providers preferences corresponding to more than one network provider as configuration data.

11. The computerized method of claim 10, wherein:
the user group is associated with a group data management level,
the first configuration data policy is applied at the group data management level such that all users of the user group have the identical network provider preference as configuration data,
a set of users is a subset of the user group and is associated with a user data management level, and
the second configuration data policy is applied at the user data management level such that each user of the set of users has a personalized network provider assigned from the more than one network provider.

12. The computerized method of claim 1, wherein a trained machine learning model generates the predicted network provider.

13. A system comprising:
memory hardware storing instructions; and
processing hardware configured to execute the instructions, wherein the instructions include:
obtaining a set of historical data characterizing interactions of a user with a first network provider and a second network provider, wherein:
a first healthcare network includes the first network provider and the second network provider,
configuration data corresponding to an account of the user includes a network provider preference associated with the first healthcare network,
the first network provider includes a restrictive condition with respect to the second network provider,
the restrictive condition is set by the first network provider, and
the restrictive condition indicates that the network provider preference is constrained to one of the first network provider or the second network provider;
generating, using the set of historical data, a predicted network provider indicating one of the first network provider or the second network provider; and
communicating the predicted network provider as a recommended network provider preference for the configuration data corresponding to the account of the user,
wherein generating the predicted network provider includes:
determining whether the set of historical data has met a sufficiency threshold,
in response to a determination that the set of historical data has not met the sufficiency threshold, generating a default prediction,
in response to a determination that the set of historical data has met a sufficiency threshold, determining whether a subset of historical data is within a threshold age, and
in response to a determination that the subset of historical data is within the threshold age:
selecting a data model of a set of data models, and
supplying the restrictive condition to the selected data model as a rule.

14. The system of claim 13, wherein:
obtaining the set of historical data characterizing interactions of the user with the first network provider and the second network provider is in response to an enrollment request to enroll a user group with a plurality of network providers,
the user group includes a plurality of sets of users,
a respective set of users includes more than one user sharing a relationship attribute, and
the more than one user includes the user.

15. The system of claim 13, further comprising:
receiving an enrollment request for a group of users including the user, wherein:
the enrollment request requests enrollment with a set of network providers, and
the set of network providers includes the first network provider and the second network provider; and
determining that the first network provider of the set of network providers includes the restrictive condition with respect to the second network provider of the set of network providers.

16. The system of claim 13, wherein:
the instructions include receiving a request to change a user group that includes the user from a first configuration data policy to a second configuration data policy,
the first configuration data policy has a first data state where each user of the user group includes an identical network provider preference as configuration data,
the second configuration data policy has a second data state where the user group includes network providers preferences corresponding to more than one network provider as configuration data, the user group is associated with a group data management level, the first configuration data policy is applied at the group data management level such that all users of the user group have the identical network provider preference as configuration data, a set of users is a subset of the user group and is associated with a user data management level, and the second configuration data policy is applied at the user data management level such that each user of the set of users has a personalized network provider assigned from the more than one network provider.

17. A non-transitory computer-readable medium comprising processor-executable instructions, the instructions including:

obtaining a set of historical data characterizing interactions of a user with a first network provider and a second network provider, wherein:

a first healthcare network includes the first network provider and the second network provider, configuration data corresponding to an account of the user includes a network provider preference associated with the first healthcare network, the first network provider includes a restrictive condition with respect to the second network provider, the restrictive condition is set by the first network provider, and the restrictive condition indicates that the network provider preference is constrained to one of the first network provider or the second network provider;

generating, using the set of historical data, a predicted network provider indicating one of the first network provider or the second network provider; and communicating the predicted network provider as a recommended network provider preference for the configuration data corresponding to the account of the user, wherein generating the predicted network provider includes:

determining whether the set of historical data has met a sufficiency threshold, in response to a determination that the set of historical data has not met the sufficiency threshold, generating a default prediction, in response to a determination that the set of historical data has met a sufficiency threshold, determining whether a subset of historical data is within a threshold age, and in response to a determination that the subset of historical data is within the threshold age:

selecting a data model of a set of data models, and supplying the restrictive condition to the selected data model as a rule.

18. The non-transitory computer-readable medium of claim 17, wherein the instructions include:

receiving an enrollment request for a group of users including the user, wherein the enrollment request requests enrollment with a set of network providers, and wherein the set of network providers includes the first network provider and the second network provider; and determining that the first network provider of the set of network providers includes the restrictive condition with respect to the second network provider of the set of network providers.

19. The non-transitory computer-readable medium of claim 17, wherein:

the instructions include receiving a request to change a user group that includes the user from a first configuration data policy to a second configuration data policy, the first configuration data policy has a first data state where each user of the user group includes an identical network provider preference as configuration data, the second configuration data policy has a second data state where the user group includes network providers preferences corresponding to more than one network provider as configuration data, the user group is associated with a group data management level, the first configuration data policy is applied at the group data management level such that all users of the user group have the identical network provider preference as configuration data, a set of users is a subset of the user group and is associated with a user data management level, and the second configuration data policy is applied at the user data management level such that each user of the set of users has a personalized network provider assigned from the more than one network provider.

* * * * *